US007770151B2

(12) United States Patent
Sanjar et al.

(10) Patent No.: US 7,770,151 B2
(45) Date of Patent: Aug. 3, 2010

(54) AUTOMATIC GENERATION OF SOLUTION DEPLOYMENT DESCRIPTORS

(75) Inventors: Amir Farrokh Sanjar, Austin, TX (US); Cristi Nesbitt Ullmann, Austin, TX (US); Paul Stuart Williamson, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1155 days.

(21) Appl. No.: 11/211,950

(22) Filed: Aug. 25, 2005

(65) Prior Publication Data

US 2006/0230314 A1 Oct. 12, 2006

Related U.S. Application Data

(63) Continuation-in-part of application No. 11/127,846, filed on May 12, 2005, now abandoned, which is a continuation-in-part of application No. 11/109,038, filed on Apr. 19, 2005, now Pat. No. 7,526,759, and a continuation-in-part of application No. 11/109,069, filed on Apr. 19, 2005.

(51) Int. Cl.
*G06F 9/44* (2006.01)
*G06F 9/445* (2006.01)

(52) U.S. Cl. .................. 717/109; 717/113; 717/174

(58) Field of Classification Search .................. None
See application file for complete search history.

(56) References Cited

U.S. PATENT DOCUMENTS

| 4,813,013 | A | 3/1989 | Dunn |
| 5,377,318 | A | 12/1994 | Wolber |
| 5,394,522 | A | 2/1995 | Sanchez-Frank et al. |
| 5,511,215 | A | 4/1996 | Terasaka et al. |
| 5,555,370 | A | 9/1996 | Li et al. |
| 5,572,648 | A | 11/1996 | Bibayan |
| 5,632,022 | A | 5/1997 | Warren et al. |

(Continued)

FOREIGN PATENT DOCUMENTS

KR 2002068316 8/2002

OTHER PUBLICATIONS

"BEAWeblogic Platform™: Deploying WebLogic Platform Applications," BEA Systems, Dec. 2004, pp. i-viii, "1-1" through "B-16" (172 total pages).*

(Continued)

*Primary Examiner*—James Rutten
(74) *Attorney, Agent, or Firm*—Robert H. Frantz; David A. Mims, Jr.

(57) ABSTRACT

Deployment descriptor files are generated for automation of installation and integration of computing system solution components by associating configurable behavioral models with a system solution design, configuring instantiations of the models to contain behavioral parameters, and, responsive to a user defining a connection between two model instances, displaying an intelligence form according to an expertise level of the user, receiving user inputs establishing configuration and option parameters for the connected model instances, saving the configuration and option parameters in a sub-template that defines the interface between the model instances in the system solution design, generating deployment descriptors by extracting the behavioral and configuration parameters from each sub-template, and packaging the configured behavioral model instances and deployment descriptor files into an application package for automatic deployment.

12 Claims, 31 Drawing Sheets

U.S. PATENT DOCUMENTS

| | | | |
|---|---|---|---|
| 5,848,393 | A | 12/1998 | Goodridge |
| 5,913,055 | A | 6/1999 | Yoshida et al. |
| 5,913,065 | A | 6/1999 | Faustini |
| 6,208,345 | B1 | 3/2001 | Sheard et al. |
| 6,259,448 | B1 | 7/2001 | McNally et al. |
| 6,272,672 | B1 | 8/2001 | Conway |
| 6,279,154 | B1 | 8/2001 | Davis |
| 6,282,711 | B1 | 8/2001 | Halpern et al. |
| 6,334,211 | B1 | 12/2001 | Kojima et al. |
| 6,367,073 | B2 | 4/2002 | Elledge |
| 6,393,557 | B1 | 5/2002 | Guthridge et al. |
| 6,405,364 | B1 | 6/2002 | Bowman-Amuah |
| 6,427,132 | B1 | 7/2002 | Bowman-Amuah |
| 6,446,200 | B1 | 9/2002 | Ball et al. |
| 6,591,244 | B2 | 7/2003 | Jim et al. |
| 6,601,233 | B1 | 7/2003 | Underwood |
| 6,618,857 | B1 | 9/2003 | Zimmiewicz et al. |
| 6,698,018 | B1 | 2/2004 | Zimmiewicz et al. |
| 6,725,249 | B2 | 4/2004 | Sidi et al. |
| 6,738,964 | B1 | 5/2004 | Zink et al. |
| 6,744,450 | B1 | 6/2004 | Zimmiewicz et al. |
| 6,748,583 | B2 | 6/2004 | Aizenbud-Reshef et al. |
| 6,785,805 | B1 | 8/2004 | House et al. |
| 6,879,685 | B1 | 4/2005 | Peterson et al. |
| 6,882,723 | B1 | 4/2005 | Peterson et al. |
| 6,912,710 | B2 * | 6/2005 | Broussard et al. ........... 717/170 |
| 6,937,705 | B1 | 8/2005 | Godfrey et al. |
| 6,937,993 | B1 | 8/2005 | Gabbita et al. |
| 6,966,039 | B1 | 11/2005 | Bartz et al. |
| 7,065,637 | B1 | 6/2006 | Nanja |
| 7,082,521 | B1 | 7/2006 | Nanja |
| 7,100,195 | B1 | 8/2006 | Underwood |
| 7,103,562 | B2 | 9/2006 | Kosiba et al. |
| 7,139,999 | B2 | 11/2006 | Bowman-Amuah |
| 7,228,541 | B2 | 6/2007 | Gupton, et al. |
| 7,290,056 | B1 | 10/2007 | McLaughlin, Jr. |
| 7,313,534 | B2 | 12/2007 | Scheer |
| 7,356,482 | B2 | 4/2008 | Frankland et al. |
| 7,376,904 | B2 | 5/2008 | Cifra et al. |
| 7,404,175 | B2 * | 7/2008 | Lee et al. .................... 717/104 |
| 7,428,733 | B2 * | 9/2008 | Woollen ..................... 719/315 |
| 7,478,385 | B2 | 1/2009 | Sierer, et al |
| 7,496,888 | B2 | 2/2009 | Sanjar et al. |
| 7,526,759 | B2 | 4/2009 | Sanjar et al. |
| 2002/0066073 | A1 | 5/2002 | Lienhard et al. |
| 2002/0073094 | A1 | 6/2002 | Becker et al. |
| 2002/0091990 | A1 | 7/2002 | Little et al. |
| 2003/0037327 | A1 | 2/2003 | Cicciarelli et al. |
| 2003/0177018 | A1 | 9/2003 | Hughes |
| 2003/0222906 | A1 | 12/2003 | Fish et al. |
| 2004/0025155 | A1 | 2/2004 | Sedlack et al. |
| 2004/0044514 | A1 | 3/2004 | Granny et al. |
| 2004/0107414 | A1 | 6/2004 | Bronicki et al. |
| 2004/0122645 | A1 | 6/2004 | Shevenell et al. |
| 2004/0143810 | A1 | 7/2004 | Ahmed et al. |
| 2004/0177002 | A1 | 9/2004 | Abelow |
| 2004/0181771 | A1 | 9/2004 | Anonsen et al. |
| 2004/0221267 | A1 | 11/2004 | Chase et al. |
| 2004/0260715 | A1 | 12/2004 | Mongeon et al. |
| 2005/0114240 | A1 * | 5/2005 | Watson-Luke et al. ........ 705/34 |
| 2005/0262462 | A1 | 11/2005 | Janakiraman et al. |
| 2006/0230314 | A1 | 10/2006 | Sanjar et al. |
| 2006/0235760 | A1 | 10/2006 | Sanjar et al. |
| 2006/0271581 | A1 | 11/2006 | Sanjar et al. |

OTHER PUBLICATIONS

"IBM WebSphere V5.0 for Linux, Implementation and Deployment Guide WebSphere Handbook Series", by Mark Endrei, et al., published by International Business Machines Corp., copyright Feb. 2003, downloaded from http://www.ibm.com/redbooks, 158 pages.

"J2EE(TM) Developer's Guide, Overview, J2EE Applications", downloaded from http://java.sun.com/j2ee/sdk_1.2.1/techdocs/guides/ejb/html/Overview5.html on May 10, 2005, 5 pages.

"Packaging Applications", downloaded from http://java.sun.com/j2ee/1.4/docs/tutorial/doc/Overview5.html on May 20, 2005, 2 pages.

Quatrani, Terry; "Visual Modeling with Rational Rose and UML", Dec. 18, 1997, Chapters 1-12.

Template Softvvare Inc. (Dulles, VA), "Using the WFT Development Environment", copyright 1998.

Template Softvvare Inc. (Dulles, VA), "Developing a WFT Workflow System", copyright 1998.

USPTO; Image File Wrapper contents retrieved on Nov. 18, 2009 from USPTO Private PAIR including Office Actions, Applicant Replies, and Notices of References Cited, from pending U.S. Appl. No. 12/211,344, filed on Sep. 16, 2008.

IEEE Colloquium on Automated Testing and Software Solutions; Abstract, AN-4218601; 1992.

Hill, P.; Abstract of "Quality Software Solutions", AN-4218609; 1992.

Krzanik, L.; "Enactable Models for Quantitative Evolutionary Software Processess", Institute of Automatics, Academy of Mining and Metallurgy, Krakow, Poland 1988.

Quatrani, Terry; "Visual Modeling with Rational Rose and UML", Dec. 18, 1997, Chapters 1-12.

Template Software Inc. (Dulles, VA), "Using the WFT Development Environment", copyright 1998.

Template Software Inc. (Dulles, VA), "Developing a WFT Workflow System", copyright 1998.

Visual Modeling with Rational Rose and UML, Terry Quantrani, Dec. 18, 1997, Chapters 1-12. Image is not available via public PAIR.

Template Workflow Template Process Foundation, Using the WFT Development Environment (ENV) Whole Manual, copy right 1998. Image is not available via public PAIR.

Wreder, K, Oeng, Yi .. "Architecture-centered enterprise system development and integration based on distributed objecttechnology standard." Computer Software and Applications Conference (1999): 250-258.

"J2EE(TM) Developer's Guide, Overview, J2EE Applications", downloaded from http://java.sun.com/J2eelsdk_1.2.1/ techdocs/guides/ejb/html/Overview5.html on May 10, 2005,5 pages.

IBM Corp.; "Interpretation of UML model elements by UML-to-EJB transformations", retrieved on May 6, 2009 from http://publib.boulder.ibm.com/infocenter/.

Sun Microsystems; "7.4 Deployment Descriptors"; retrieved on May 6, 2009 from http://java.sun.com/blueprints/guidelines!.

Ambler, Scott w.; "UML 2 Deployment Diagrams"; retrieved on May 6, 2009 from http://www.agilemodeling.com/artifacts/deploymentDiagram.htm.

Quantrani, Terry; "Visual Modeling with Rational Rose and UML"; Dec. 18, 1997; chapters 1-12, in U.S. Appl. No. 11/109,038.

Template Workflow Template Process Foundation, Using the WFT Development Environment (ENV), whole manual, copyright 1998, in U.S. Appl. No. 11/109,038.

"IBM WebSphere V5.0 for Linux, Implementation and Deployment Guide WebSphere Handbook Series", by Mark Endrei, et al., published by International Business Machines Corp., copyright Feb. 2003, downloaded from http://Dwww.ibm.com!redbooks, 158 pages. found in 11109069.

United States Patent Office, examination correspondence in related U.S. Appl. No. 11/127,846, inventor Amir Farrokh Sanjar, now abandoned, published at and retrieved from http://www.uspto.com private PAIR on Dec. 10, 2009, including non-patent literature and foreign patent copies, including copies of non-patent literature as available on this date.

"Una. Soluzione Software Per Il Collaudo Automatico", No translation. Fossati, F., A.; Abstract of "Software Solution for Automatic Testing", AN-3270053;1988; copy found in Non-patent Literature citation #1 above for U.S. Appl. No. 11/127,846, see Title. Elettronica Oggi, n. 66.

United States Patent Office, examination correspondence in U.S. Appl. No. 11/109,069, of Amir Farrokh Sanjar, as published and retrieved on Dec. 10, 2009 from Public Patent Application Information Retrieval (PAIR) Image File Wrapper (IFW) at http://www.uspto.gov, including copies of non-patent literature as available on this date.

Template Workflow Template Process Foundation, "Developing a WFT System (WFT)", chapters 1-4, copyright 1998, cited by examiner in U.S. Appl. No. 11/109,038 of Amir Farrokh Sanjar.

United States Patent Office, examination correspondence in related U.S. Appl. No. 11/101,604, inventor Amir Farrokh Sanjar, now abandoned, published at and retrieved on Dec. 14, 2009 from Public Patent Application Information Retrieval (PAIR) Image File Wrapper (IFW) at http://www.uspto.com, including copies of non-patent literature as available on this date.

United States Patent Office, examination correspondence in related U.S. Appl. No. 11/109,038, inventor Amir Farrokh Sanjar, now abandoned, published at and retrieved on Dec. 10, 2009 from Public Patent Application Information Retrieval (PAIR) Image File Wrapper (IFW) at http://www.uspto.com, including copies of non-patent literature as available on this date.

* cited by examiner

Example UML Model in XML for a Database Component

```
<?xml version="1.0" encoding="UTF-8"?>
<!DOCTYPE itemDefinition SYSTEM "itemDefinition.dtd" >
<itemDefinition>
 <productName>DB2 UDB Enterprise Edition 8.1.2</productName>
 <item itemDelimiter="" itemState="M" itemType="STANZA">
   <itemDescription>Description</itemDescription>
   <itemValue>Value/Choice</itemValue>
   <itemName>Installation Parameter Name</itemName>
   <item itemDelimator="," itemState="M" itemType="CHOICE">
      <itemDescription>Product type to be installed.
   Only one can be selected.
   </itemDescription>
      <itemValue>ENTERPRISE_SERVER_EDITION</itemValue>
   <itemValues>
   ENTERPRISE_SERVER_EDITION,
   APPLICATION_DEVELOPMENT_CLIENT,
   CONNECT_PERSONAL_EDITION,
   CONNECT_ENTERPRISE_EDITION, DATA_LINKS_MANAGER,
   DB2_HTML_DOCUMENTATION,ADMINISTRATION_CLIENT,
   LIFE_SCIENCES_DATA_CONNECT,PERSONAL_EDITION,
   RELATIONAL_CONNECT,RUNTIME_CLIENT,
   SPATIAL_EXTENDER, WAREHOUSE_MANAGER,WAREHOUSE_MANAGER_CONNECTORS,
   WORKGROUP_SERVER_EDITION
    </itemValues>
      <itemName>PROD</itemName>
  </item>
</itemDefinition>
```

Figure 10

Example Item Description DTD

```
<?xml version="1.0" encoding="UTF-8"?>
<!ELEMENT itemDefinition (productName, item+)>
<!ELEMENT productName (#PCDATA)>
<!ELEMENT item
(itemDescription, itemValue, itemValues?,
itemName,item*)
>
<!ELEMENT itemDescription (#PCDATA)>
<!ELEMENT itemValue (#PCDATA)>
<!ELEMENT itemValues (#PCDATA)>
<!ELEMENT itemName (#PCDATA)>
<!ATTLIST item
itemType CDATA #REQUIRED
itemState CDATA #REQUIRED
itemDelimator CDATA #REQUIRED
>
```

Figure 11

Example MQ Version 5.3 Description in XML

```xml
<?xml version="1.0" encoding="UTF-8"?>
<!DOCTYPE itemDefinition SYSTEM "itemDefinition.dtd" >
<itesmDefinition>
 <productName>Websphere MQ 5.3</productName>
 <item itemDelimator="" itemState="M" itemType="STANZA">
   <itemDescription>Description</itemDescription>
   <itemValue>Value/Choice</itemValue>
   <itemName>Response</itemName>
   <item itemState="O" itemType="TEXT" itemDelimator="">
     <itemDescription>'Folder for the WebSphere MQ program files. For
       example,c:\mqm.</itemDescription>
     <itemValue>"C:\Program Files\IBM\Websphere MQ"</itemValue>
     <itemName>PGMFOLDER</itemName>
   </item>
   <item itemState="O" itemType="TEXT" itemDelimator="">
     <itemDescription>Folder for the WebSphere MQ data files. For example,
       c:\mqm\data.</itemDescription>
     <itemValue>"C:\Program Files\IBM\Websphere MQ\Data"</itemValue>
     <itemName>DATFOLDER</itemName>
   </item>
   <item itemState="O" itemType="TEXT" itemDelimator="">
     <itemDescription>Folder for the WebSphere MQ queue manager log files.
       For example, c:\mqm\log.</itemDescription>
     <itemValue>"C:\Program Files\IBM\Websphere MQ\Log"</itemValue>
     <itemName>LOGFOLDER</itemName>
   </item>
   <item itemState="M" itemType="CHOICE" itemDelimator=",">
     <itemDescription>Accept the terms of the license. For a silent installation,
       this must be set to yes.</itemDescription>
     <itemValue>Yes</itemValue>
     <itemValues>Yes,No</itemValues>
     <itemName>AGREETOLICENSE</itemName>
   </item>
   <item itemState="O" itemType="CHOICE" itemDelimator=",">
     <itemDescription>If the Server feature is to be uninstalled, whether to
       delete any existing queue managers. delete removes any existing
       queue managers. keep, or any other value, keeps
       them</itemDescription>
     <itemValue>Keep</itemValue>
     <itemValues>Keep,Delete</itemValues>
     <itemName>KEEPQMDATA</itemName>
   </item>
   <item itemState="O" itemType="CHOICE" itemDelimator=",">
     <itemDescription>If the WebAdmin feature is already installed from a
       previous version of MQSeries, it will be uninstalled. This property
       gives you the option to delete the existing Web Administration
       scripts. delete removes any existing Web Administration scripts.
       keep, or any other value, keeps them</itemDescription>
     <itemValue>Keep</itemValue>
     <itemValues>Keep,Delete</itemValues>
     <itemName>KEEPWEBDATA</itemName>
   </item>
```

Figure 12a

Example MQ Version 5.3  Description in XML (continued)

```xml
<item itemState="0" itemType="MULTI_CHOICE" itemDelimator=",">
    <itemDescription>List of features to install locally. All installs all features
        Default installs the typical features. If you do not want a feature use
        REMOVE=feature. The valid features are listed in the table
        below</itemDescription>
    <itemValue>ALL</itemValue>
    <itemValues>ALL,Server,GuiAdmin,Client,JavaMsg,Toolkit</itemValues>
    <itemName>ADDLOCAL</itemName>
</item>
<item itemState="0" itemType="CHOICE" itemDelimator=",">
    <itemDescription>Start the WebSphere MQ Service at the end of
        installation.</itemDescription>
    <itemValue>Yes</itemValue>
    <itemValues>Yes,No</itemValues>
    <itemName>STARTSERVICE</itemName>
</item>
<item itemState="0" itemType="CHOICE" itemDelimator=",">
    <itemDescription>Start the WebSphere MQ taskbar application at the end
        of installation. . (The default) Start the WebSphere MQ taskbar
        application at the end of installation if it was running at the start, or
        if this is a new installation. Anything else. Start the taskbar
        application at the end of the installation. Ignored if the server
        feature is not installed.</itemDescription>
    <itemValue>Yes</itemValue>
    <itemValues>Yes,No</itemValues>
    <itemName>STARTTASKBAR</itemName>
</item>
</item>
<item itemState="0" itemType="STANZA" itemDelimator="">
    <itemDescription>Contains general properties related to how the MQParms
        command runs and to the installation of WebSphere MQ. Valid values are
        listed in "MSI Stanza" table</itemDescription>
    <itemValue>Value/Choice</itemValue>
    <itemName>MSI</itemName>
    <item itemState="0" itemType="CHOICE" itemDelimator=",">
        <itemDescription>system. Install using the language of the default system
            locale (the default).\nuser. Install using the language of the default locale of
            the user.</itemDescription>
        <itemValue>system</itemValue>
        <itemValues>system,user</itemValues>
        <itemName>MQPLANGUAGE</itemName>
    </item>
    <item itemState="0" itemType="TEXT" itemDelimator=",">
        <itemDescription>MQParms generates a text log file with the specified
            name and location.</itemDescription>
        <itemValue>path\file_name</itemValue>
        <itemName>MQPLOG</itemName>
    </item>
</item>
<item itemDelimator="" itemState="0" itemType="STANZA">
    <itemDescription>Description</itemDescription>
    <itemValue>Values</itemValue>
    <itemName>Services Stanza</itemName>
    <item itemDelimator="," itemState="0" itemType="CHOICE">
        <itemDescription>The type of user account to use. local. Creates a local
            user account. domain. Uses the domain user account specified by
            DOMAINNAME, USERNAME, and PASSWORD. Do not use
            double quotes</itemDescription>
        <itemValue>local</itemValue>
        <itemValues>local,domain</itemValues>
        <itemName>USERTYPE</itemName>
    </item>
</item>

</itemDefinition>
```

Figure 12b

Example WAS Version 5.1 Description in XML

```xml
<?xml version="1.0" encoding="UTF-8"?>
<!DOCTYPE itemDefinition SYSTEM "itemDefinition.dtd" >
<itemDefinition>
  <productName>WebSphere Application Server 5.1</productName>
  <item itemDelimator="" itemState="M" itemType="STANZA">
    <itemDescription>Description</itemDescription>
    <itemValue>Value/Choice</itemValue>
    <itemName>Parameter Name</itemName>
    <item itemDelimator="," itemState="M" itemType="CHOICE">
      <itemDescription>Custom installation, or full installation</itemDescription>
      <itemValue>custom</itemValue>
      <itemValues>custom,full</itemValues>
      <itemName>-W setupTypes.selectedSetupTypeId</itemName>
    </item>
    <item itemDelimator="," itemState="O" itemType="CHOICE">
    <itemDescription>Silent install</itemDescription>
    <itemValue>silent</itemValue>
    <itemValues>silent,not-silent</itemValues>
    <itemName>-silent</itemName>
    </item>
    <item itemDelimator="" itemState="O" itemType="TEXT">
    <itemDescription>Install location for WAS.  </itemDescription>
    <itemValue>"C:\Program Files\WebSphere\AppServer"</itemValue>
    <itemName>-P wasBean.installLocation</itemName>
    </item>
    <item itemDelimator="" itemState="O" itemType="TEXT">
    <itemDescription>This value is required if you choose to install IBM HTTP Server(IHS).
If the location has a previous IHS installed, please delete all contents in the
corresponding folder.  Uninstall the previous IHS is not
sufficient.</itemDescription>
    <itemValue>"C:\Program Files\IBMHTTPServer"</itemValue>
    <itemName>-P ihsFeatureBean.installLocation</itemName>
    </item>
    <item itemDelimator="," itemState="O" itemType="CHOICE">
    <itemDescription>To install the application server.</itemDescription>
    <itemValue>true</itemValue>
    <itemValues>true,false</itemValues>
    <itemName>-P serverBean.active</itemName>
    </item>
    <item itemDelimator="," itemState="O" itemType="CHOICE">
    <itemDescription>To install the amininstration features.</itemDescription>
    <itemValue>true</itemValue>
    <itemValues>true,false</itemValues>
    <itemName>-P adminBean.active</itemName>
    </item>
    <item itemDelimator="" itemState="O" itemType="CHOICE">
    <itemDescription>To install Scripting Administration features.</itemDescription>
    <itemValue>true</itemValue>
    <itemValues>true,false</itemValues>
    <itemName>-P adminScriptingFeatureBean.active</itemName>
    </item>
    <item itemDelimator="," itemState="O" itemType="CHOICE">
    <itemDescription>To install Administrative Console.</itemDescription>
    <itemValue>true</itemValue>
    <itemValues>true,false</itemValues>
    <itemName>-P adminConsoleFeatureBean.active</itemName>
    </item>
    <item itemDelimator="," itemState="O" itemType="CHOICE">
    <itemDescription>To install application Assembly and Deployment
```

Figure 13a

<u>Example WAS Version 5.1 Description in XML (cont.)</u>
```
tools.</itemDescription>
    <itemValue>true</itemValue>
    <itemValues>true,false</itemValues>
    <itemName>-P applicationAndAssemblyToolsBean.active </itemName>
    </item>
    <item itemDelimator="," itemState="0" itemType="CHOICE">
    <itemDescription>To install Deploy tools.</itemDescription>
    <itemValue>true</itemValue>
    <itemValues>true,false</itemValues>
    <itemName>-P deployToolBean.active</itemName>
    </item>
    <item itemDelimator="," itemState="0" itemType="CHOICE">
    <itemDescription>To install Ant Utilities</itemDescription>
    <itemValue>true</itemValue>
    <itemValues>true,false</itemValues>
    <itemName>-P antUtilityBean.active</itemName>
    </item>
    <item itemDelimator="," itemState="0" itemType="CHOICE">
    <itemDescription>To install Embedded Messaging</itemDescription>
    <itemValue>true</itemValue>
    <itemValues>true,false</itemValues>
    <itemName>-P mqSeriesBean.active</itemName>
    </item>
    <item itemDelimator="," itemState="0" itemType="CHOICE">
    <itemDescription>To install Embedded Messaging Server and Client.</itemDescription>
    <itemValue>true</itemValue>
    <itemValues>true,false</itemValues>
    <itemName>-P mqSeriesServerBean.active</itemName>
    </item>
    <item itemDelimator="" itemState="0" itemType="TEXT">
    <itemDescription>Install location for Embedded Messaging Server and
Client.</itemDescription>
    <itemValue>"C:\Program Files\IBM\WebSphereMQ"</itemValue>
    <itemName>-P mqSeriesServerBean.installLocation</itemName>
    </item>
    <item itemDelimator="," itemState="0" itemType="CHOICE">
    <itemDescription>To install Embedded Messaging Client only.  Only one of installing
Embedded Messageing of Server and Client, or installing Embedded Messaging of
Client  can be chosen.</itemDescription>
    <itemValue>false</itemValue>
    <itemValues>false,true</itemValues>
    <itemName>-P mqSeriesClientBean.active</itemName>
    </item>
    <item itemDelimator="" itemState="0" itemType="TEXT">
    <itemDescription>Install location for Embedded Messaging Client.</itemDescription>
    <itemValue>"C:\Program Files\IBM\WebSphereMQ"</itemValue>
    <itemName>-P mqSeriesClientBean.installLocation</itemName>
    </item>
    <item itemDelimator="," itemState="0" itemType="CHOICE">
    <itemDescription>To install Message-Driven bean samples.</itemDescription>
    <itemValue>true</itemValue>
    <itemValues>true,false</itemValues>
    <itemName>-P mqSeriesSamplesBean.active</itemName>
    </item>
    <item itemDelimator="," itemState="0" itemType="CHOICE">
    <itemDescription>To install IHS Web Server 1.3.28.</itemDescription>
    <itemValue>true</itemValue>
    <itemValues>true,false</itemValues>
    <itemName>-P ihsFeatureBean.active</itemName>
    </item>
```

Figure 13b

Example WAS Version 5.1 Description in XML (cont.)

```xml
<item itemDelimator="," itemState="0" itemType="CHOICE">
<itemDescription>To install Web Server Plugins.</itemDescription>
<itemValue>true</itemValue>
<itemValues>true,false</itemValues>
<itemName>-p pluginBean.active </itemName>
</item>
<item itemDelimator="," itemState="0" itemType="CHOICE">
<itemDescription>To install IBM HTTP Server V1.3 Plugin.</itemDescription>
<itemValue>true</itemValue>
<itemValues>true,false</itemValues>
<itemName>-P ihsPluginBean.active</itemName>
</item>
<item itemDelimator="," itemState="0" itemType="CHOICE">
<itemDescription>To install IBM HTTP Server V2.0 Plugin.</itemDescription>
<itemValue>false</itemValue>
<itemValues>false,true</itemValues>
<itemName>-P ihs20PluginBean.active</itemName>
</item>
<item itemDelimator="," itemState="0" itemType="CHOICE">
<itemDescription>To install Apache Web Server V1.3 Plugin.</itemDescription>
<itemValue>false</itemValue>
<itemValues>false,true</itemValues>
<itemName>-P apachePluginBean.active </itemName>
</item>
<item itemDelimator="," itemState="0" itemType="CHOICE">
<itemDescription>To install Apache Web Server V2.0 Plugin.</itemDescription>
<itemValue>false</itemValue>
<itemValues>false,true</itemValues>
<itemName>-P apache20PluginBean.active</itemName>
</item>
<item itemDelimator="," itemState="0" itemType="CHOICE">
<itemDescription>To install Microsoft Internet Information Services (IIS) Plugin.</itemDescription>
<itemValue>false</itemValue>
<itemValues>false,true</itemValues>
<itemName>-P iisPluginBean.active</itemName>
</item>
<item itemDelimator="," itemState="0" itemType="CHOICE">
<itemDescription>To install iPlanet Web Server Plugin.</itemDescription>
<itemValue>false</itemValue>
<itemValues>false,true</itemValues>
<itemName>-P iplanet60PluginBean.active</itemName>
</item>
<item itemDelimator="," itemState="0" itemType="CHOICE">
<itemDescription>To install Domino Web Server Plugin.</itemDescription>
<itemValue>flase</itemValue>
<itemValues>false, true</itemValues>
<itemName>-P dominoPluginBean.active</itemName>
</item>
<item itemDelimator="," itemState="0" itemType="CHOICE">
<itemDescription>To install samples.</itemDescription>
<itemValue>true</itemValue>
<itemValues>true,false</itemValues>
<itemName>-P samplesBean.active </itemName>
</item>
<item itemDelimator="," itemState="0" itemType="CHOICE">
<itemDescription>To install performance and analysis tools.</itemDescription>
<itemValue>true</itemValue>
<itemValues>true,false</itemValues>
<itemName>-P performanceAndAnalysisToolsBean.active</itemName>
</item>
```

Figure 13c

Example WAS Version 5.1 Description in XML (cont.)

```
<item itemDelimator="," itemState="0" itemType="CHOICE">
   <itemDescription>To install Tivoli Performance Viewer.</itemDescription>
   <itemValue>true</itemValue>
   <itemValues>true,fallse</itemValues>
   <itemName>-P tivoliPerfBean.active</itemName>
</item>
<item itemDelimator="," itemState="0" itemType="CHOICE">
   <itemDescription>To install Dynamic Cache Monitor.</itemDescription>
   <itemValue>false</itemValue>
   <itemValues>true,false</itemValues>
   <itemName>-P DCMBean.active</itemName>
</item>
<item itemDelimator="," itemState="0" itemType="CHOICE">
   <itemDescription>To install Performance Servlet.</itemDescription>
   <itemValue>true</itemValue>
   <itemValues>true,false</itemValues>
   <itemName>-P performanceServletBean.active</itemName>
</item>
<item itemDelimator="," itemState="0" itemType="CHOICE">
   <itemDescription>To install Log Analyzer.</itemDescription>
   <itemValue>true</itemValue>
   <itemValues>true,false</itemValues>
   <itemName>-P logAnalyzerBean.active</itemName>
</item>
<item itemDelimator="," itemState="0" itemType="CHOICE">
   <itemDescription>To install Javadocs</itemDescription>
   <itemValue>true</itemValue>
   <itemValues>true,false</itemValues>
   <itemName>-P javadocBean.active</itemName>
</item>
<item itemDelimator="" itemState="0" itemType="TEXT">
   <itemDescription>The node name is used for administration, and must be unique within its
group of notes (cell). Replace the "DefaultNode" with your node name. For
migration from previous version, use the same node name as the one in previous
version. </itemDescription>
   <itemValue>DefaultNode</itemValue>
   <itemName>-W nodeNameBean.nodeName</itemName>
</item>
<item itemDelimator="" itemState="0" itemType="TEXT">
   <itemDescription>Enter a resolveable hostname or IP address of your machine.
</itemDescription>
   <itemValue>127.0.0.1</itemValue>
   <itemName>-W nodeNameBean.hostName</itemName>
</item>
<item itemDelimator="," itemState="0" itemType="CHOICE">
   <itemDescription>To install services for IHS and Websphere Application Server on
Windows.  Using the services, you can start and stop the services.</itemDescription>
   <itemValue>true</itemValue>
   <itemValues>true,false</itemValues>
   <itemName>-W serviceSettingsWizardBean.active</itemName>
</item>
<item itemDelimator="," itemState="0" itemType="CHOICE">
   <itemDescription>To install IHS Services. If it sets to be "true", it requires -W
```

Figure 13d

Example WAS Version 5.1 Description in XML (cont.)

```
serviceSettingWizardBean.active also set to be "true".</itemDescription>
    <itemValue>true</itemValue>
    <itemValues>true,false</itemValues>
    <itemName>-W serviceSettingsWizardBean.ihsChoice</itemName>
    </item>
    <item itemDelimator="," itemState="0" itemType="CHOICE">
    <itemDescription>To install the WebSphere Application Server Service.  If it sets to be
"true", it requires -W serviceSettingWizardBean.active also set to be
"true".</itemDescription>
    <itemValue>true</itemValue>
    <itemValues>true,false</itemValues>
    <itemName>-W serviceSettingsWizardBean.wasChoice</itemName>
    </item>
    <item itemDelimator="" itemState="0" itemType="TEXT">
    <itemDescription>User ID for installing the Services. It is required if  -W
serviceSettingsWizardBean.ihsChoice = "true" or -W
serviceSettingsWizardBean.wasChoice="true". The ID must be an admin, or must
have admin authority to install a Service.  The ID must also have "Log  on as a
Service" authority.</itemDescription>
    <itemValue>installation user ID</itemValue>
    <itemName>-W serviceSettingsWizardBean.userName</itemName>
    </item>
    <item itemDelimator="" itemState="C" itemType="TEXT">
    <itemDescription>It is required if -W serviceSettingsWizardBean.ihsChoice = "true" or -W
serviceSettingsWizardBean.wasChoice="true".  The password much be the same as
the one for the OS., otherwise, the installation will not continue.</itemDescription>
    <itemValue> </itemValue>
    <itemName>-W serviceSettingsWizardBean.password</itemName>
    </item>
    <item itemDelimator="," itemState="0" itemType="CHOICE">
    <itemDescription>To install the launcher icon for start server.</itemDescription>
    <itemValue>true</itemValue>
    <itemValues>true,false</itemValues>
    <itemName>-P StartServerIconBean.active</itemName>
    </item>
    <item itemDelimator="," itemState="0" itemType="CHOICE">
    <itemDescription>To install the launcher icon for stop server.</itemDescription>
    <itemValue>true</itemValue>
    <itemValues>true,false</itemValues>
    <itemName>-P StopServerIconBean.active</itemName>
    </item>
    <item itemDelimator="," itemState="0" itemType="CHOICE">
    <itemDescription>To install the launcher icon for AdminConsole.</itemDescription>
    <itemValue>true</itemValue>
    <itemValues>true,false</itemValues>
    <itemName>-P AdminConsolIconBean.active</itemName>
    </item>
    <item itemDelimator="," itemState="0" itemType="CHOICE">
    <itemDescription>To install the launcher icon for the samples gallery.</itemDescription>
    <itemValue>true</itemValue>
    <itemValues>true,false</itemValues>
    <itemName>-P SamplesGalleryIconBean.active</itemName>
    </item>
    <item itemDelimator="," itemState="0" itemType="CHOICE">
    <itemDescription>To install  the launcher icon for the Tivoli - -
```

Figure 13e

Example WAS Version 5.1 Description in XML (cont.)

```
Performance.</itemDescription>
    <itemValue>true</itemValue>
    <itemValues>true,false</itemValues>
    <itemName>-P TivoliPerfIconBean.active</itemName>
    </item>
    <item itemDelimator="," itemState="O" itemType="CHOICE">
    <itemDescription>To install the launcher icon for the corresponding
component.</itemDescription>
    <itemValue>true</itemValue>
    <itemValues>true,false</itemValues>
    <itemName>-P infoCenterIconBean.active </itemName>
    </item>
    <item itemDelimator="," itemState="O" itemType="CHOICE">
    <itemDescription>To install the launcher icon for the FirstSteps.</itemDescription>
    <itemValue>true</itemValue>
    <itemValues>true,flase</itemValues>
    <itemName>-P firstStepsIconBean.active</itemName>
    </item>
    <item itemDelimator="," itemState="O" itemType="CHOICE">
    <itemDescription>To install the launcher for the LogAnalyzer</itemDescription>
    <itemValue>true</itemValue>
    <itemValues>true,false</itemValues>
    <itemName>-P logAnalyzerIconBean.active</itemName>
    </item>
    <item itemDelimator="" itemState="O" itemType="TEXT">
    <itemDescription>Change the path to the prerequisite checker configuration file only if
a new
file has been provided.  Make sure the corresponding DTD is also presented in the
same path.</itemDescription>
    <itemValue>waspc/prereqChecker.xml</itemValue>
    <itemName>-W osLevelCheckActionBean.configFilePath</itemName>
    </item>
    <item itemDelimator="" itemState="C" itemType="TEXT">
    <itemDescription>If -P ihsPluginBean.active="true", and -P
ihsFeatureBean.active="false", it
is required.  It should be the fully qualified path, including the config file
name.</itemDescription>
    <itemValue>"C:\Program Files\IBMHTTPServer\conf\httpd.conf"</itemValue>
    <itemName>-W defaultIHSConfigFileLocationBean.value</itemName>
    </item>
    <item itemDelimator="" itemState="C" itemType="TEXT">
    <itemDescription>If -P ishPluginBean.active="true, it is required.  It should be the
fully qualified path, including the config file name.</itemDescription>
    <itemValue>Location of the config file</itemValue>
    <itemName>-W defaultIHS20ConfigFileLocationBean.value</itemName>
    </item>
    <item itemDelimator="" itemState="C" itemType="TEXT">
    <itemDescription>If -P apachePluginBean.active ="true", it is required.  It should be
the fully
qualified path, including the config file name.</itemDescription>
    <itemValue>Location of the config file </itemValue>
    <itemName>-W defaultApacheConfigFileLocationBean.value</itemName>
    </item>
    <item itemDelimator="" itemState="C" itemType="TEXT">
    <itemDescription>If -P apache20PluginBean.active="true", it is required.  It should be
the
```

Figure 13f

Example WAS Version 5.1  Description in XML (cont.)

```
fully qualified path, including the config file name.</itemDescription>
    <itemValue>Location of the config file</itemValue>
    <itemName>-W defaultApache20ConfigFileLocationBean.value</itemName>
    </item>
    <item itemDelimator="" itemState="C" itemType="TEXT">
    <itemDescription>If -P iplanet60PluginBean.active="true", it is required.  It should be
the
fully qualified path, including the config file name.</itemDescription>
    <itemValue>Location of the config file</itemValue>
    <itemName>-W defaultIPlanetConfigFileLocationBean.value</itemName>
    </item>
    <item itemDelimator="" itemState="C" itemType="TEXT">
    <itemDescription>If -P dominoPluginBean.active="true", it is required.  It should be the
fully qualified path, including the Jar file name.</itemDescription>
    <itemValue>Location of the Jar file</itemValue>
    <itemName>-W dominoPanelBean.notesJarFile</itemName>
    </item>
    <item itemDelimator="" itemState="C" itemType="TEXT">
    <itemDescription>If -P dominoPluginBean.active="true", it is required.  It should be the
fully
qualified path, including the file name.</itemDescription>
    <itemValue>Location of the file</itemValue>
    <itemName>-W dominoPanelBean.namesFile</itemName>
    </item>
    <item itemDelimator="," itemState="O" itemType="CHOICE">
    <itemDescription>For product registration for silent install.</itemDescription>
    <itemValue>false</itemValue>
    <itemValues>false,true</itemValues>
    <itemName>-W launchPRTBean.active</itemName>
    </item>
    <item itemDelimator="," itemState="O" itemType="CHOICE">
    <itemDescription>To install the default Applications</itemDescription>
    <itemValue>true</itemValue>
    <itemValues>true,false</itemValues>
    <itemName>-W installSampleAppSequenceBean.active</itemName>
    </item>
    <item itemDelimator="," itemState="O" itemType="CHOICE">
    <itemDescription>To display First Steps at the end of the
installation.</itemDescription>
    <itemValue>false</itemValue>
    <itemValues>false,true</itemValues>
    <itemName>-W firstStepsSequenceBean.active</itemName>
    </item>
    <item itemDelimator="," itemState="O" itemType="CHOICE">
    <itemDescription>To run the Insallation Verification Tool.</itemDescription>
    <itemValue>true</itemValue>
    <itemValues>true,false</itemValues>
    <itemName>-W installIvtAppSequenceBean.active</itemName>
    </item>
  </item>
</itemDefinition>
```

Figure 13g

AUTOMATIC GENERATION OF SOLUTION DEPLOYMENT DESCRIPTORS

CROSS-REFERENCE TO RELATED APPLICATIONS

Claiming Benefit Under 35 U.S.C. 120

This patent application is a continuation-in-part of abandoned U.S. patent application Ser. No. 11/127,846 filed on May 12, 2005, which was a continuation-in-part of U.S. patent Ser. No. 11/109,038 U.S. Pat. No. 7,526,759 filed on Apr. 19, 2005, and of U.S. patent application Ser. No. 11/109,069, filed on Apr. 19, 2005, which were continuations of U.S. Pat. No. 7,496,888, filed on Apr. 7, 2005, all of which are commonly assigned.

INCORPORATION BY REFERENCE

The related patent U.S. application Ser. No. 11/127,846, filed on May 12, 2005, Ser. No. 11/109,038, filed on Apr. 19, 2005, Ser. No. 11/109,069, filed on Apr. 19, 2005, and Ser. No. 11/101,604, filed on Apr. 7, 2005, are hereby incorporated by reference in their entireties including figures.

Additionally, two publications are in incorporated in their entireties:
(a) "IBM WebSphere V5.0 for Linux, Implementation and Deployment Guide WebSphere Handbook Series" by Mark Endrei, et al.; and
(b) "J2EE™ Developer's Guide—Overview—J2EE Applications", by Sun Microsystems Inc.

FEDERALLY SPONSORED RESEARCH AND DEVELOPMENT STATEMENT

This invention was not developed in conjunction with any Federally sponsored contract.

MICROFICHE APPENDIX

Not applicable.

BACKGROUND OF THE INVENTION

1. Field of the Invention

This invention relates to a Solution Builder Wizard that utilizes templates and interfaces with predefined intelligence to allow speedy assembly of various software components into one cohesive product form.

2. Background of the Invention

Recently, a shift has occurred among enterprise computing supplies to address "vertical markets". These "solutions" targeted to the specific needs, business processes, and problems for a certain industry, such as insurance claim processing, health care insurance filing, mortgage application handling, etc. Industry solutions often consists of one or more operating systems and middleware products that are packaged along with customized, industry specific, data, and code that are installed and configured to function as one cohesive business solution. There are many software and consulting firms who are focused on implementing vertical industry solutions using a collection of disparate products produced by a wide array of vendors.

To implement a vertical industry solution, a single expert is not sufficient to complete the project because it requires expert level skills and knowledge of such a wide array of products, systems, platforms, configurations, options, protocols, etc. Further, all of these different components must be integrated and cooperate with each other in specific, often proprietary ways.

As a result, a team of specialists are usually required to install and deploy the entire project. To mitigate risk, customers often request that a prototype or proof of a concept system be installed or demonstrated in order to provide concrete evidence of viability of the solution, and of the business value of the solution, prior to purchase.

This places much engineering and development work up front and before a formal purchase order is issued, which increases the financial risk to the supplier or suppliers. In some cases, it can take eight weeks or even more to gather requirements, and to create a prototype that solves the customer's problems. Then, it can take months to implement and test a prototype, including producing some sort of data which simulates various scenarios and test cases.

This "up front" effort requires a massive amount of time and expenditures in some cases. Because it lasts so long, there is a very real possibility that components (e.g. software applications, operating systems, etc.) will be revised and patched, so the final configuration, if ordered, will have unknown characteristics as the newer releases and patches will also have to be integrated and tested before formal deployment.

Thus, the processes currently employed in the industry place a heavy risk and financial burden on the supplier prior to a sale being completed, which is reflected in the pricing of the final systems to the customers, the increased cost of which must be either absorbed by the customers or passed on to their own clients. In either situation, the customer may either experience reduced profitability, reduced ability to compete on price, or both.

SUMMARY OF THE INVENTION

The present invention utilizes a Graphical User Interface driven model in an integrated development environments ("IDEs"), such as IDE's based upon the open-sourced Eclipse platform, to create diverse end-to-end computing solutions from building block components. The building block components are available in the GUI to the solution developer on a "solution component palette". The solution developer selects, drags and drops instances of each required solution component into a "solution design area", and then connects them together in a logical manner according to system interactions and data flow.

Each time the solution developer specifies or creates a "connection" between two components in the design area, the invention invokes specific logic which determines the needed configuration and option parameters to interface the selected components to each other. This logic provides a "pop-up" dialogue to the solution developer to prompt the user for selections and input. The input information is then used by the logic to configure the two components to interact with each other within the pre-defined constraints and conditions of the logic, thereby relieving the user of needing to be an expert in the configuration and installation of either of the components.

For example, a component palette may include an IBM DB/2 database icon, an IBM WebSphere web server application icon, and an IBM MQ server icon with a backend server such as an IBM 390. The solution developer can drag an instance of the DB/2 icon from the palette to the solution design area of the display, thus making it a component of the current solution. Next, the developer can drag an instance of the WebSphere from the palette to the design area, followed by connecting it to the DB/2 instance, or followed by dragging and dropping more instances of more components.

When a connection between two or more components is made or defined, the invention automatically recognizes the need for customization information for this type of connection, and prompts the developer to enter the required configuration data necessary to make the connection valid and functional, such as user id and password, data source, network address, encryption options, etc. This information is then saved to configuration files which can later be used during actual installation of the system components into the solution.

Prior to deployment or installation of the system solution, the present invention allows the designer to simulate operation and interactions of all of the components using actual data collected from existing customer solutions, simulated data, or a combination of both types of data. During simulation, the solution under design can be debugged using the present invention, which monitors data flow between system components and provides certain diagnostic and analysis capabilities.

BRIEF DESCRIPTION OF THE DRAWINGS

The following detailed description when taken in conjunction with the figures presented herein provide a complete disclosure of the invention.

FIG. 10 shows an example DB2 database model in UML.

FIG. 11 shows an Item Description DTD according to the preferred embodiment for the model of FIG. 10.

FIGS. 12a and 12b show an example item description in XML for an MQ Series server component, also according to the example DTD of FIG. 11.

FIGS. 13a-13g show an example item description in XML for a WAS component according to the example DTD of FIG. 11.

DETAILED DESCRIPTION OF THE INVENTION

Figure 1:
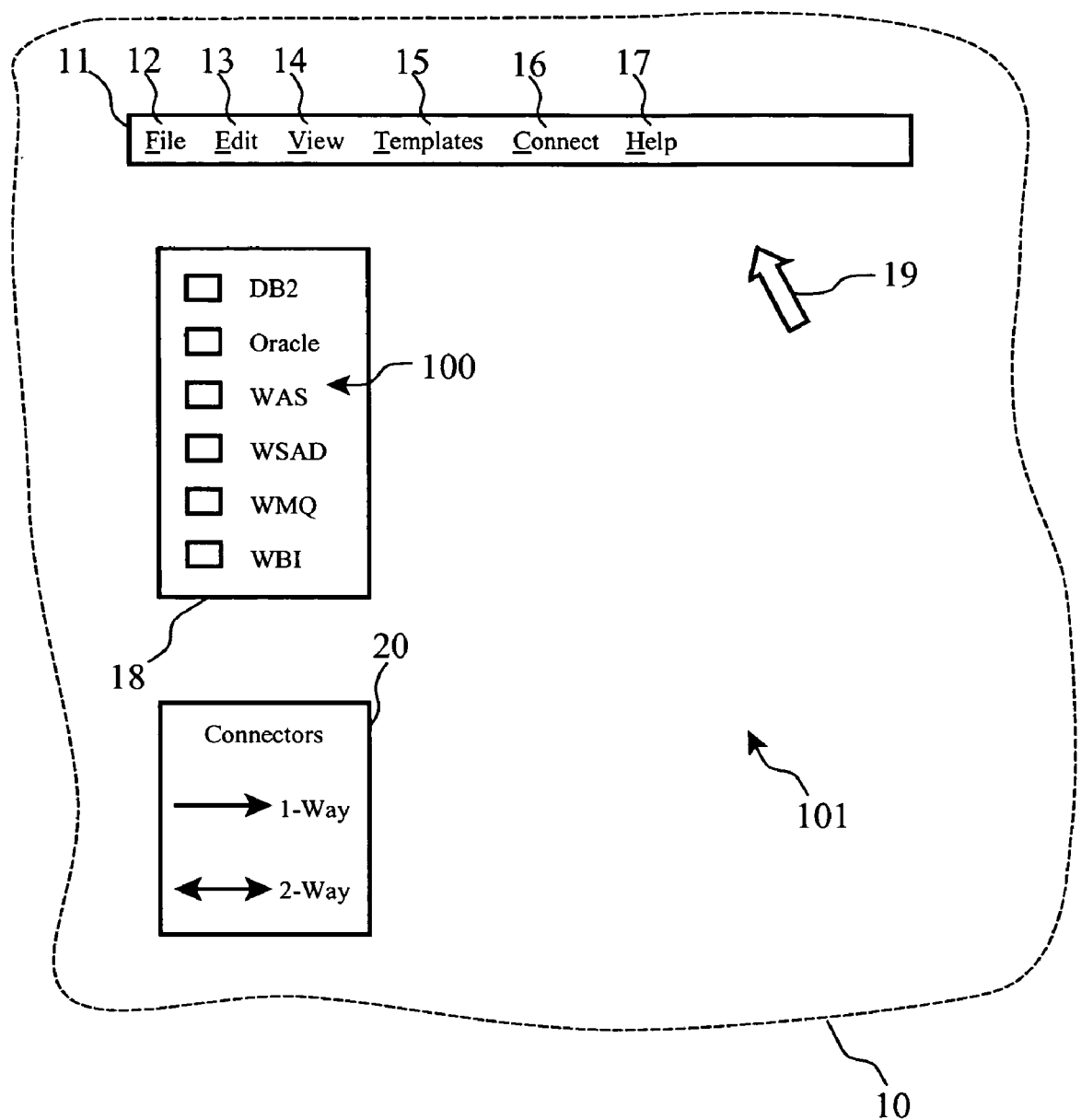
FIG. 1 shows a sample view of the Solution Builder Wizard GUI.

The invention, referred to as the "Solution Builder Wizard", uses a Graphical User Interface ("GUI"), a set of pre-defined "templates" for each component, and implementation intelligence logic, to enable speedy assembly of various solution components together into one cohesive solution. Each "template" coupled with the implementation logic for each combination of component interfaces defines a set of configuration options and parameters which can be used to customize the combination of components, without need of a high level of expertise in either component. Preferably, the templates incorporate the most common options and configurations employed, leaving out obscure or rarely used options to reduce confusion by the system developer. Default configuration parameters and values may aid in quickly defining interfaces between components so that the system developers must only change the parameters that need to be changed from default values.

Prototypes and proof of concept systems can be quickly achieved using pre-defined interfaces and configurations between disparate components of the solution. Using the invention, a tangible, operable solution can be demonstrated and tested in less time than using traditional processes, because all components are integrated with each other based upon the templates rather than upon customized or semi-customized interface and configuration definitions from various experts.

In an aspect of a preferred embodiment, each component is declared as an object using eXtensible Markup Language for the templates. Because of this advantage, the solution can be defined in a written format which can then be archived and managed by any of the widely available and widely used code repository systems, such as CATIA Viewing Services ("CVS"), IBM's Configuration Management and Version Control ("CMVC") system, Serena™ Software's PVCS Version Manager, or a similar product.

Terms, Definitions and Related Technology

We first describe some terms and related technologies which will be of use in understanding the present invention and one or more preferred embodiments.

Unified Modeling Language ("UML") is an open standard for notation of modeling of objects in the real-world. The objects can conceivably be any real thing, such as a computer with a specific program, a system device such as a printer, a peripheral such as a motor, etc. Modeling such objects is usually a first step in developing an object-oriented design methodology. UML's notation derives from approaches of three other object-oriented design and analysis methodologies, including Grady Booch's methodology for describing a set of objects and their relationships, James Rumbaugh's Object-Modeling Technique ("OMT"), and Ivar Jacobson's approach which includes a use case methodology, according to one online Information Technology source www<dot>WhatIs<dot>com, wherein <dot> is replaced with a period "." when entering the service's website address into a web browser. The UML standard is now maintained and promoted by the Object Management Group. In the following paragraphs, it shall be understood that references to UML are to one available embodiment, and that use of alternate modeling languages and methodologies may be employed without departing from the spirit and scope of the invention.

Graphical User Interface ("GUI") is a user interface that is based on graphics such as icons, menus, and pictures. In the late 1970's, the Xerox Palo Alto Research Laboratory first created the GUI concept. Today, users are most familiar with either the Apple MAC™ or Microsoft's Windows™ operating systems. Most applications today use the elements of the GUI that come with the operating system and add or modify their own graphical user interface elements for customization. GUI elements can consist of items such as: windows, buttons, iconic images, pull-down menus, wizards, and mouse. Often the phrase "look-and-feel" is use to describe a system's GUI along with its input devices. In the following paragraphs, it shall be understood that references to GUI are to just one available embodiment, and that use of alternate platform and methodologies may be employed without departing from the spirit and scope of the invention.

Eclipse is an open platform tool for integration built by an open community of tool providers such as Borland™, International Business Machines ("IBM")™, and Red Hat™. It is designed to build integrated development environments ("IDEs") which allow the creation of diverse end-to-end computing solutions for multiple computer environments while providing flexibility and management for developers in their software technology. According to the Eclipse Foundation, it has formed an independent open eco-system around royalty-free technology and a universal platform for tools integration. The Eclipse platform is a mechanism for discovering, integrating, and running modules called plug-ins based on the foundation's formal documents and white papers. The plug-in based framework enables ease of creation, integration, and utilization of software tools, in a multi-language, multi-platform, multi-vendor environment. The Eclipse Platform is written in Java language and comes with extensive plug-in construction tool kits and examples. It has been deployed on a range of development workstations including Linux, HP-UX, AIX, Solaris, QNX, OSx, and Windows based systems. In the following paragraphs, it shall be understood that references to Eclipse are to one available embodiment, and that use of alternate platform and methodologies may be employed without departing from the spirit and scope of the invention.

WebSphere Application Server ("WAS") is a comprehensive web services technology-based application server that integrates enterprise data and transactions. It is a complete Java-servlet based Web server environment consisting of two major components: a complete runtime environment and an integrated tools environment. It is a web-based tool that allows management and deployment of dynamic enterprise applications while handling extensive Java 2 Enterprise Edition ("J2EE"), security, scalability, and application performance. According to its product overview, it provides virtually any-to-any connectivity with transaction management and application adaptively, because it is optimized for ease of administration in a scalable, single-server deployment environment. WAS supports key Web Service open standards, such as Simple Object Access Protocol ("SOAP"), Universal Description, Discovery, and Integration ("UDDI"), and Web Service Description Language ("WSDL"). WAS can be used on a variety of platforms such as Sun Solaris, Windows XP, IBM AIX/6000, and IBM LINUX. Other similar products that exists today is BEA Weblogic Application Server™ and JBoss™ own suite of tools. In the following paragraphs, it shall be understood that references to WAS are to just one available embodiment, and that use of alternate platform and methodologies may be employed without departing from the spirit and scope of the invention.

WebSphere Studio Application Developer ("WSAD") is a development environment tool that is role based which developers can use to simulate test environments, handle deployment, and transmit message queues such as XML messages. The WebSphere Studio family of tools are built on top of the Eclipse Workbench as a set of plug-ins conforming to the Eclipse's open standard Application Program Interface ("API"). It is designed for professional developers of Java and J2EE applications who require integrated Java, Web, XML, and Web services support. Because users can build and test business logic inside the WSAD before deploying to a production server, it has the advantages for early detection in performance bottlenecks, and to shorten the actual test cycle with its advanced code generation. All development resources for all projects are stored in a single repository, and users have team support and can easily share work products. In the following paragraphs, it shall be understood that references to WSAD are to just one available embodiment, and that use of alternate platform and methodologies may be employed without departing from the spirit and scope of the invention.

WebSphere Business Integration ("WBI") is a part of WebSphere suite of tools that extends using the Eclipse workbench to model, simulate and manage business integration, workflows, and processes. The WBI brand encompasses a number of software technologies that offer various business integration capabilities such as WBI Modeler, WBI Server, WBI Server Foundation, WBI Message Broker, WBI Connect, WBI Administration Tools, and WBI Design Tools. These tools facilitate users to quickly model, simulate, and analyze complex business scenarios before they are implemented by integrating with existing or new software components. In addition, the administration and design tools allow for ease in system administration and workflow creation which shares some similarities to IBM's Rational™ software. In the following paragraphs, it shall be understood that references to WBI are to just one available embodiment, and that use of alternate platform and methodologies may be employed without departing from the spirit and scope of the invention.

WebSphere MQ ("WMQ") formerly known as IBM's MQ Series is a message queue system that exchanges information such as using XML to communicate across various platforms while integrating new and existing applications. It is a synchronous or asynchronous method of communicating between processes. It allows applications that reside on same server, different servers, or even different network across a global application environments to send and receive reliable and secured requests between each other. WMQ is integrated with latest Java™ Messaging Service interface standard and offers comprehensive security options using the Secure Socket Layer ("SSL"). One feature of WMQ is its ability to dynamically distribute workloads across available resources which enables messages to be delivered error-free and protects from unauthorized access. There are other message queue systems such as Microsoft's Message Queue ("MSMQ")™, Sun Java System Message Queue ("JMS")™, and Progress Software SonicMQ™. In the following paragraphs, it shall be understood that references to WMQ are to just one available embodiment, and that use of alternate platform and methodologies may be employed without departing from the spirit and scope of the invention.

Graphical User Interface

Turning to FIG. 1, the diagram shows a sample view of the Solution Builder Wizard GUI (10) according to a preferred embodiment of the invention. In the GUI, which is shown on a portion of a computer display (10), there is a customizable menu bar toward the top (11) which allows the user the ability to navigate through a file (12), edit the component palette (13), change the view option (14), select a template (15), create a connection between application components (16), or seek help (17) within the GUI application.

The GUI is pre-loaded with various solution components (100) shown in a solution component palette (18), and related intelligence logic based on customization. The available solution components can consists of different types of databases, such as DB2 or Oracle, or other application software such as WAS, WSAD, WMQ, and WBI. According to the preferred embodiment, additional solution component options can be added to the palette (18) as needed.

Connectors (20) that interface solution components with one another are shown in the palette (18), optionally. A cursor (19) is used by a developer to navigate, select, and create a solution design through the GUI, by moving components (100) from the palette (18) to the solution design area (101) of the GUI.

Figure 2A:
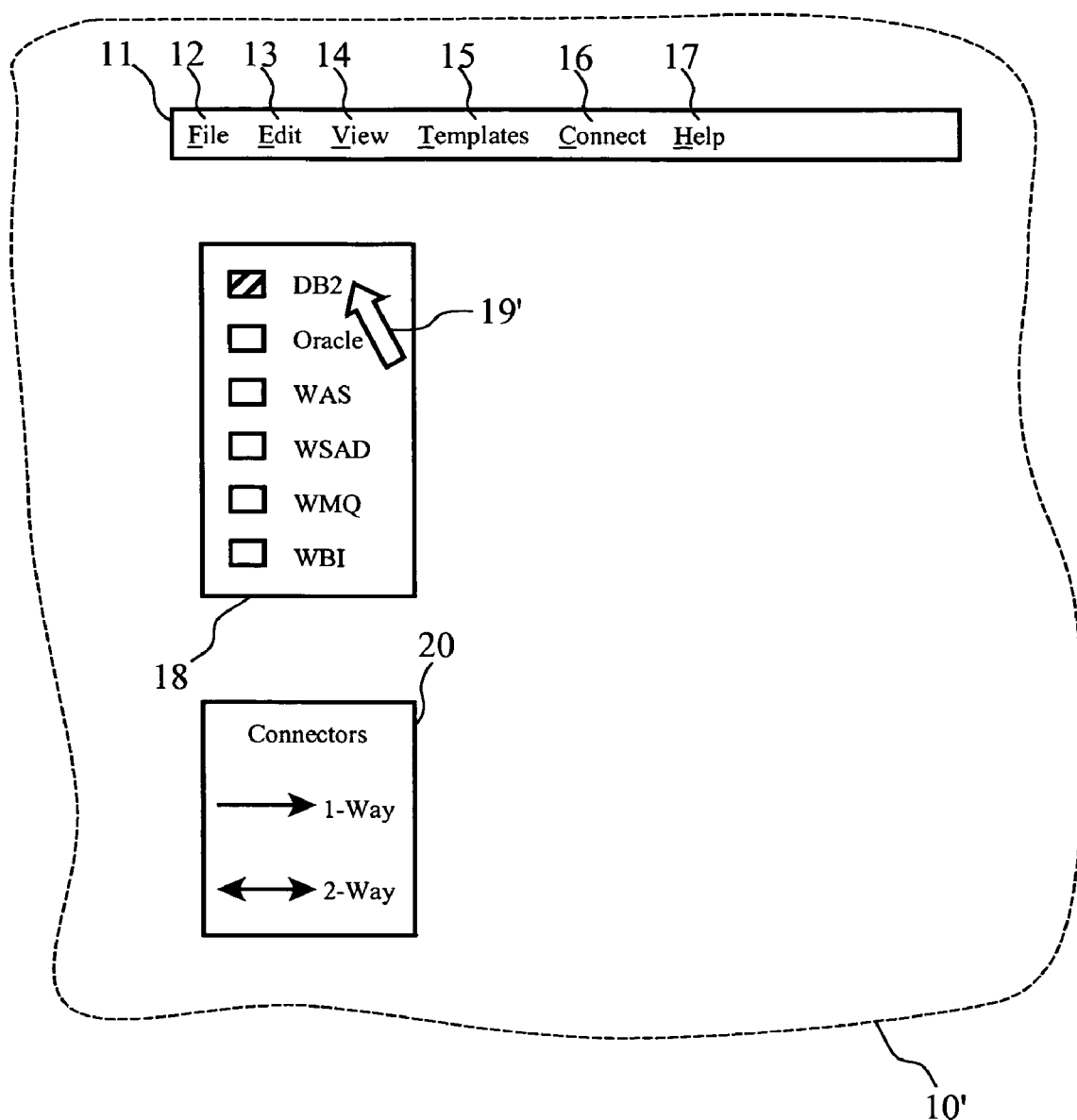
FIGS. 2a, 2b and 3 depict how the cursor is used to drag and drop solution components from the component palette to a design area.
Figure 2B:
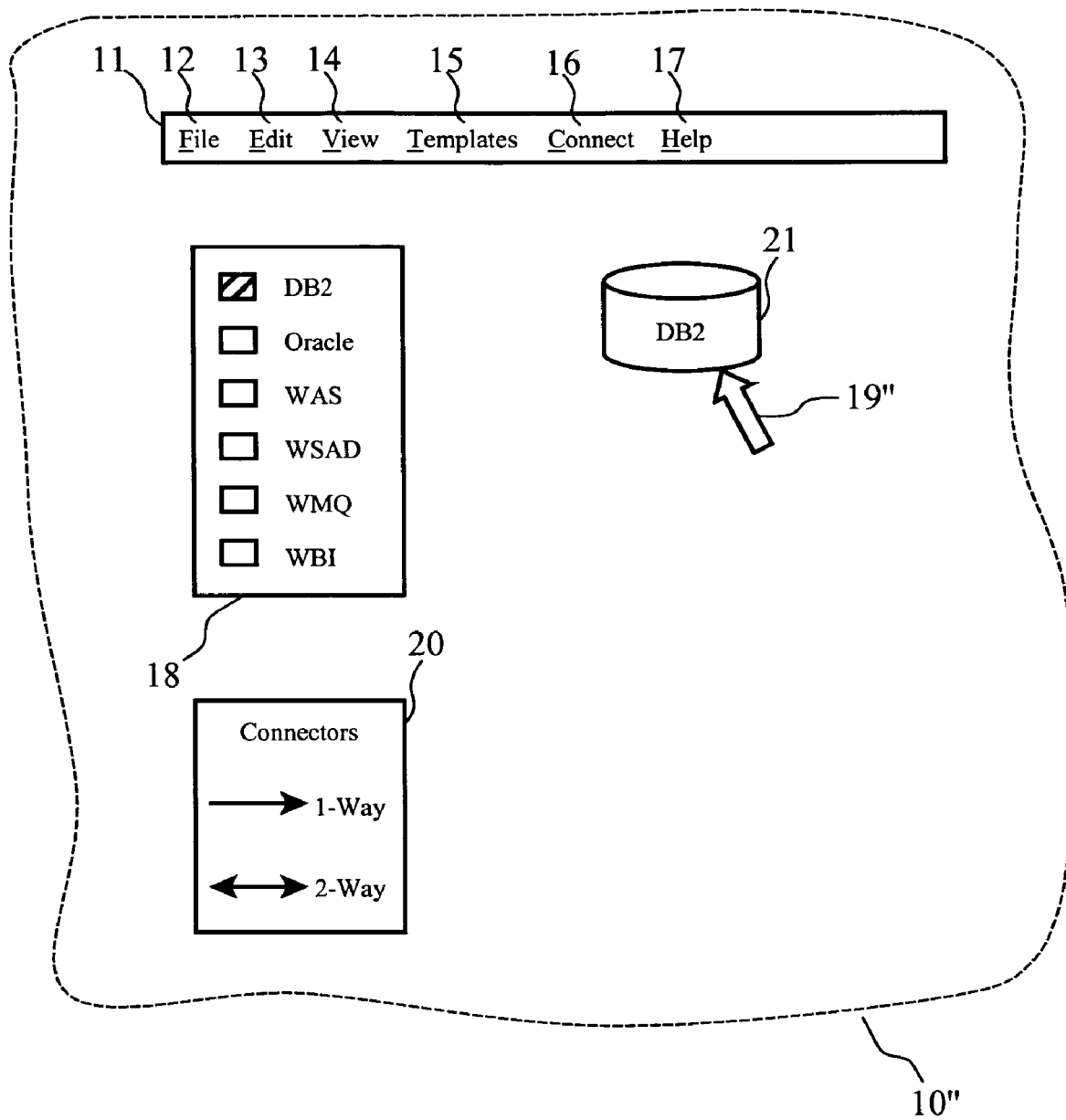

For example, FIGS. 2a and 2b show how the cursor is used to first select (19') a component in the palette, such as a DB2 database component, then drag it into the design area of the GUI, and dropping it (19") to create a new instance of a DB2 database in the solution design.

Creation of Component Instances and Relationships

Figure 3:
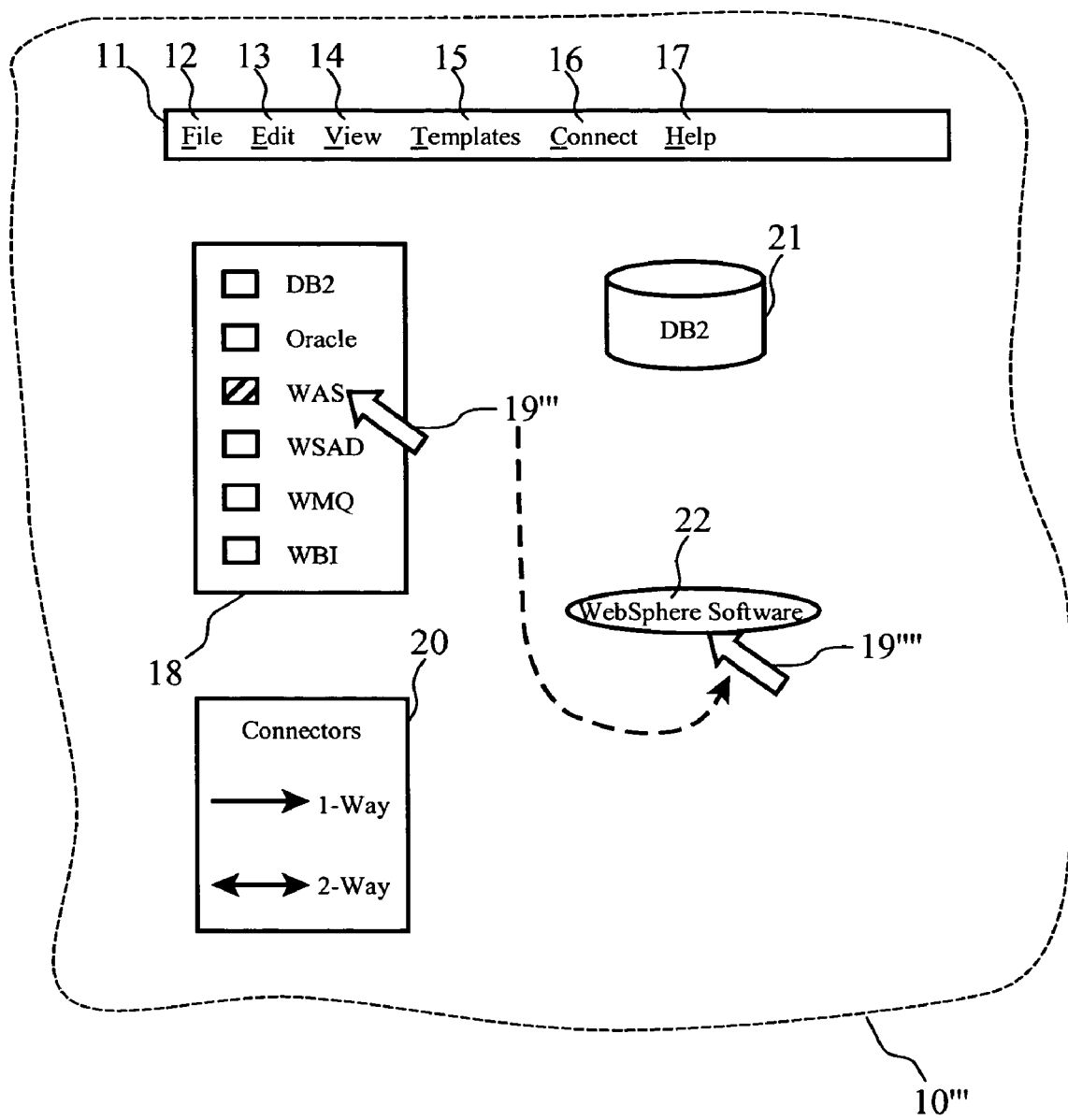

In FIG. 3, a subsequent drag and drop operation by the user has added a second component from the palette to the design area, in this example an instance of a WebSphere Application Server (22) ("WAS"). Now, the solution under design has two components—an instance of a DB2 database (21), and an instance of WAS (22).

Figure 4:
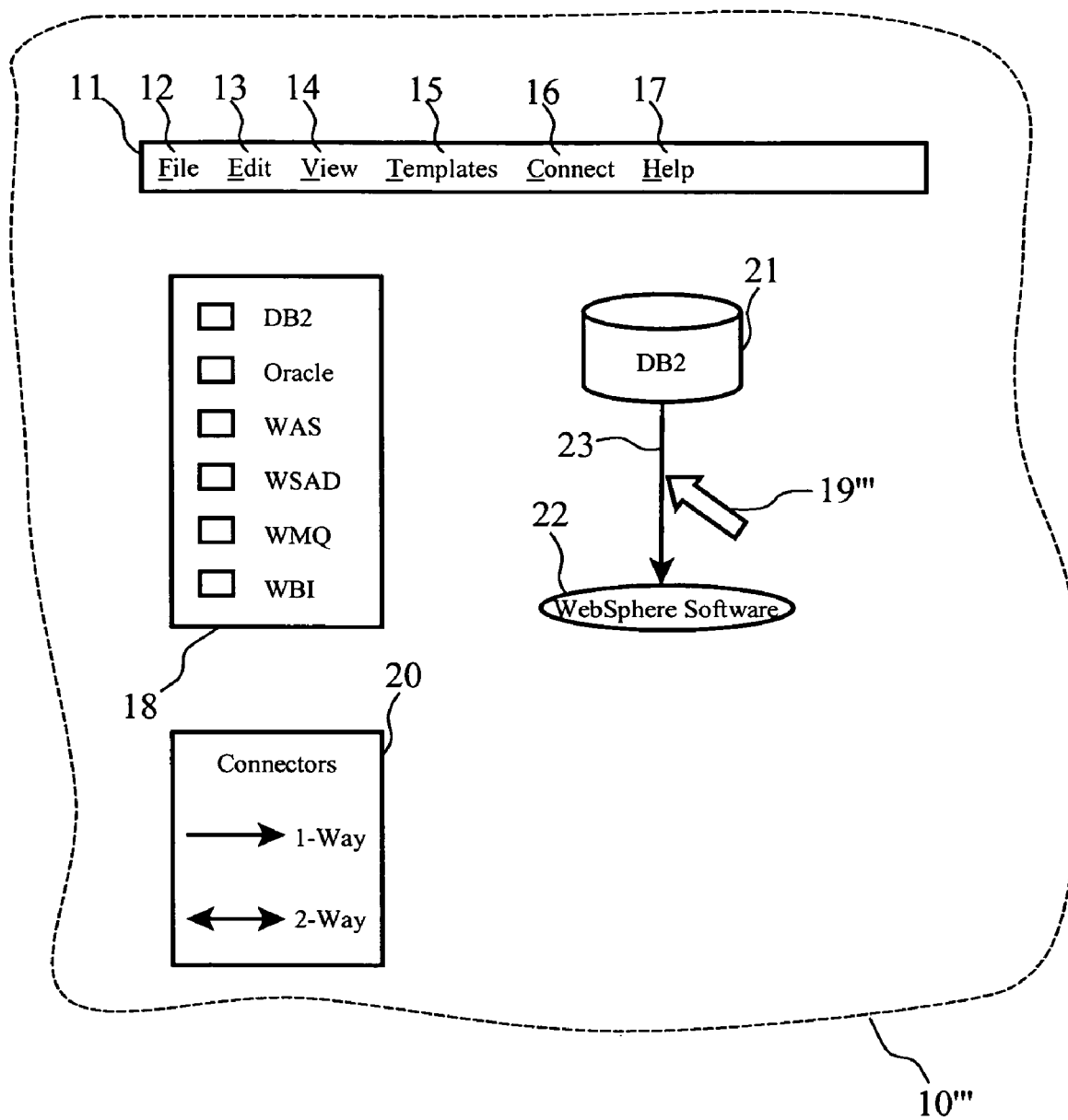
FIG. 4 illustrates how interface between components are defined.

At this point, the developer could continue to drag-and-drop components from the palette to the design area to create more instances of components in the design, or the developer can begin to define the relationships between the components already in the design. For example, by using the one-way or two-way connectors available in the GUI, FIG. 4 illustrates how components are interfaced to each other. The types of relationships available to the user is based on the predefined templates associated with each solution component. The cursor can be used to select a one-way data flow definition tool (single-headed arrow in the palette), for example, then it can be clicked once to define one end of the arrow icon (e.g. the input or output), say on the DB2 instance (21), and then clicked a second time on another component, such as the WAS (22) instance. This results in the graphical creation of an arrow (23) showing one-way data flow from the database component to the WAS component.

Figure 5:
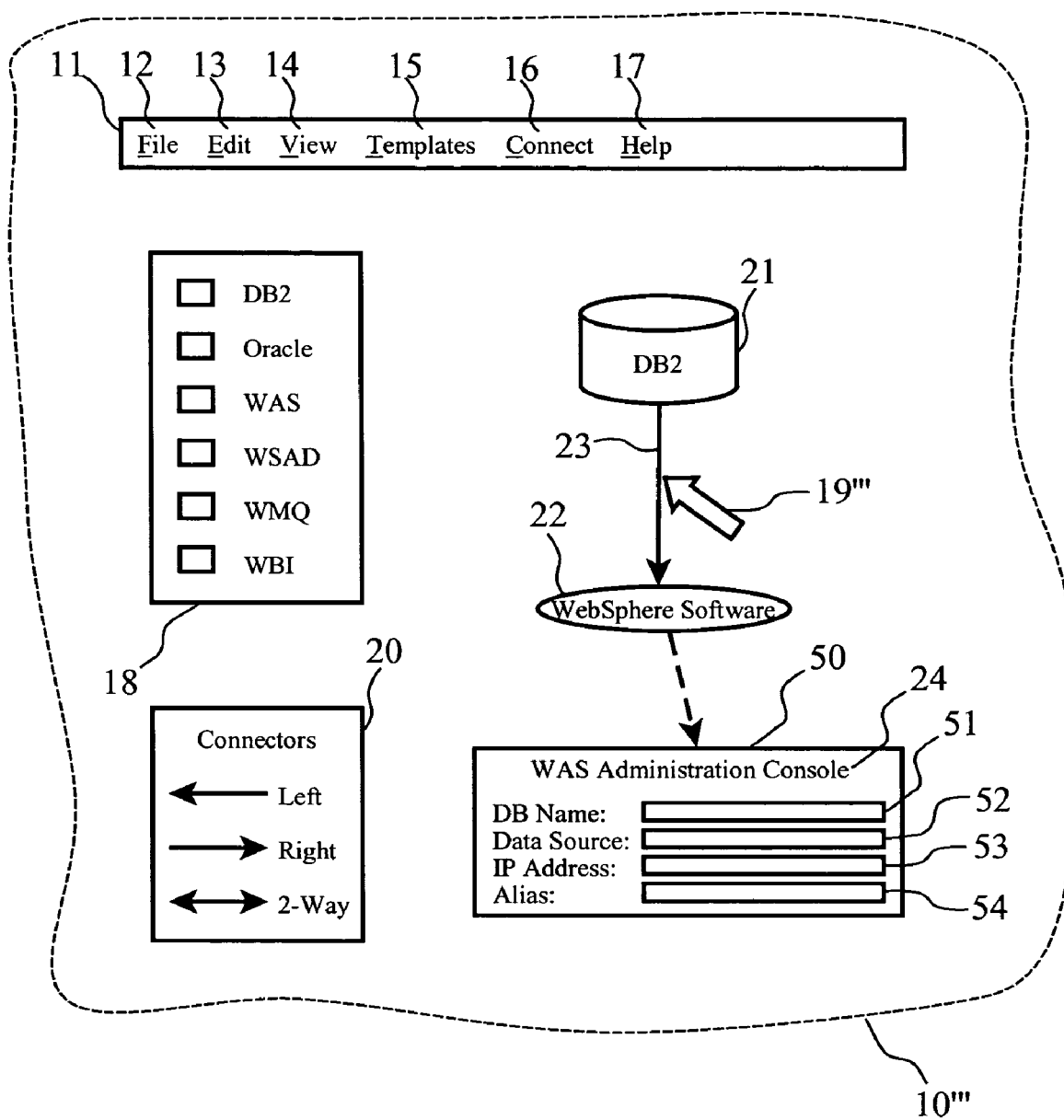
FIG. 5 shows an example user prompt for defining connection options and configuration parameters.

Once a relationship is established between two components, the intelligence logic of the invention automatically prompts the user for inputs to complete required fields that facilitate the integration process according to pre-defined options and configuration features, as defined by the XML templates. Continuing with our example and turning to FIG. 5, the user input prompt window (50) is automatically displayed by the invention's logic once a connection is completed. In this case, a WAS Administration Console is shown, requesting the user to input fields to define the interface between the WAS to the DB2, such as the database name (51), its source (52), the Internet Protocol ("IP") address (53), and an alias (54) that denotes the username and password.

Connection Intelligence Logic

Figure 6:
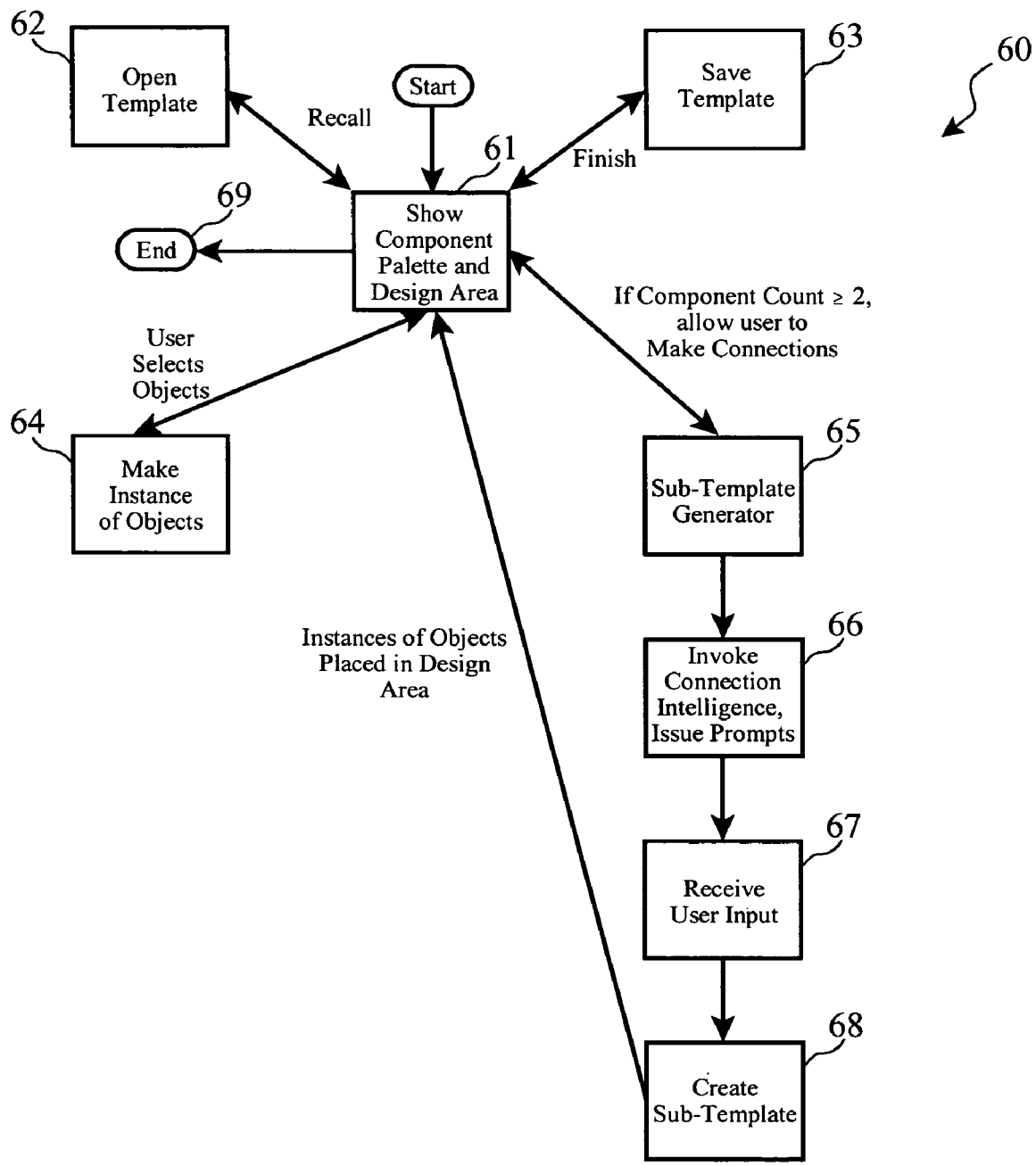
FIG. 6 illustrates a logical process for intelligent interface definition between components.

Turning to FIG. 6, a connection intelligence logical process (60) according to the invention is depicted. The GUI shows (61) a component palette and design area on the display of the developer's computer. The design area may be clear if starting a new design, or it can include components previously defined and saved (63). A "recall" (62) option allows the developer to open or import a previously saved solution design into the design area.

When each solution component in the palette is selected, dragged and dropped into the design area by the user, an object instance is created (64) in the design area. Multiple instances of the same type component can be created in this manner (e.g. multiple DB2 instances or multiple WAS instances).

Once at least two components have been added to the design area, the user can use the "make connection" option at any time. Each time a relationship between two or more components is established, a sub-template generator (65) is invoked. This displays an intelligence form (66) on the GUI to request user inputs for required and optional fields related to defining the interface between the components. When the inputs are received (67) from the user, the design area is updated to show the connection, and the sub-template is saved which defines the interface between the related components.

Figure 7:
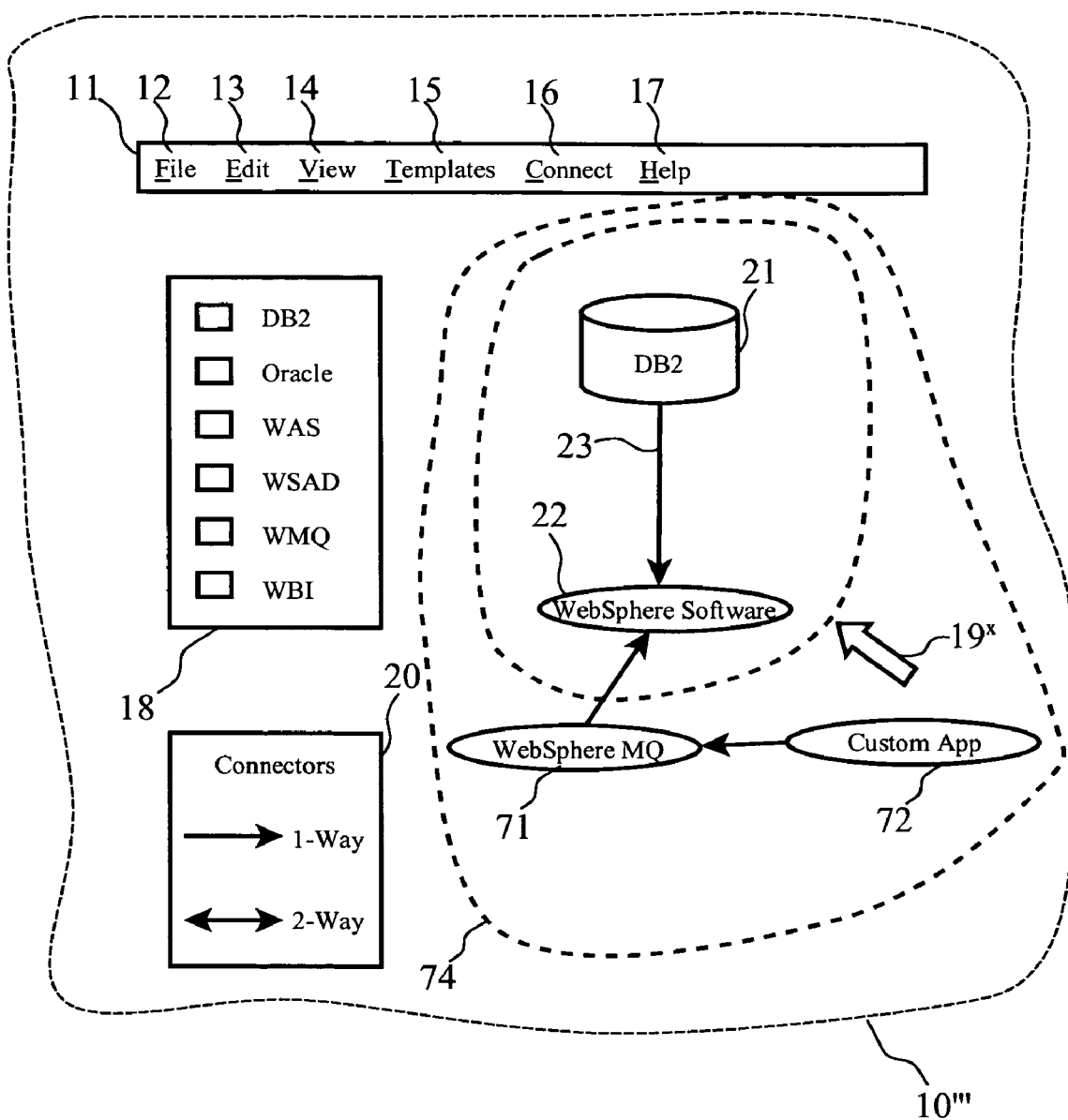
FIG. 7 shows the process in saving a partial sub-system using the GUI tool.

Turning to FIG. 7, the figures shows the process of saving a partial sub-system using the GUI tool (70). After a user has completed creating the component instances, such as adding to the previous example an instance of WMQ (71), and a custom application (72) (e.g. proprietary software, a web browser, etc.), and has defined the relationships to the components, the user can save the whole solution, or just partial sub-solutions for reuse.

For example, if the user wishes to save the entire solution including all of the component instances and their relationships, the user selects all of the components in a manner such as dragging a selection line (74) around all of the components. If the user only wishes to save a partial sub-system or sub-solution, one select only those components for saving, such as drawing a selection line (73) around the DB2 and WAS components, followed by performing a "save" function. This capability of the invention enables users to quickly create, add, or modify existing solutions through use of individual components as well as reuse of previously defined partial solutions.

Solution Builder Wizard Advantages

Using these methods, the Solution Builder Wizard provides user the ability to quickly develop a cohesive solution using a GUI palette to create the necessary components and establish the desired logical relationships between each other. The ease in drag and drop eliminates the complexity in integration and simplifies the required input information without the user having to sort through tedious amounts of manuals and guidebooks in installation and deployment. This results in saving considerable time, resources, and expense using this preferred embodiment. Not only can the proof of concept be swiftly completed, but also the enormous amount of time that can be saved during the actual installation, test, and deployment phase.

Users now have the ability to see actual or close to real simulated environment before final development occurs. The GUI provides a one-stop shop for developers to create prototypes using a variety of application components and integrate them using the simplified process driven by the intelligence logic. By updating the templates on-the-fly in the GUI, productivity increases dramatically. The flexibility of using UML allows the solution to be defined in a written format that can easily be edited or modified if necessary in CVS file format.

Component Solution Templates

As mentioned earlier, the preferred embodiment includes UML models of each available solution component written in XML. FIG. 10 shows an example DB2 database model in UML.

To correctly interpret information contained in an XML file, a system must also have an associated Document Type Definition ("DTD") file, which is file defining and constraining the data or statements allowed in an XML file for a specific purpose.

FIG. 11 shows an Item Description DTD according to the preferred embodiment for the model of FIG. 10. FIGS. 12*a* and 12*b* show an example item description in XML for an MQ Series server component, also according to the example DTD of FIG. 11. FIGS. 13*a*-13*g* show an example item description in XML for a WAS component according to the example DTD of FIG. 11, as well.

Suitable Computing Platform

The invention is preferably realized as a feature or addition to the software already found present on well-known computing platforms such as personal computers, enterprise servers, and web servers. These common computing platforms can include properly configured personal computers, as well as portable computing platforms, such as personal digital assistants ("PDA"), web-enabled wireless telephones, and other types of personal information management ("PIM") devices, providing that they have suitable resources to support the software applications and logical processes as described in the foregoing paragraphs.

Therefore, it is useful to review a generalized architecture of a computing platform which may span the range of implementation, from a high-end web or enterprise server platform, to a personal computer, to a portable PDA or web-enabled wireless phone.

Figure 8:
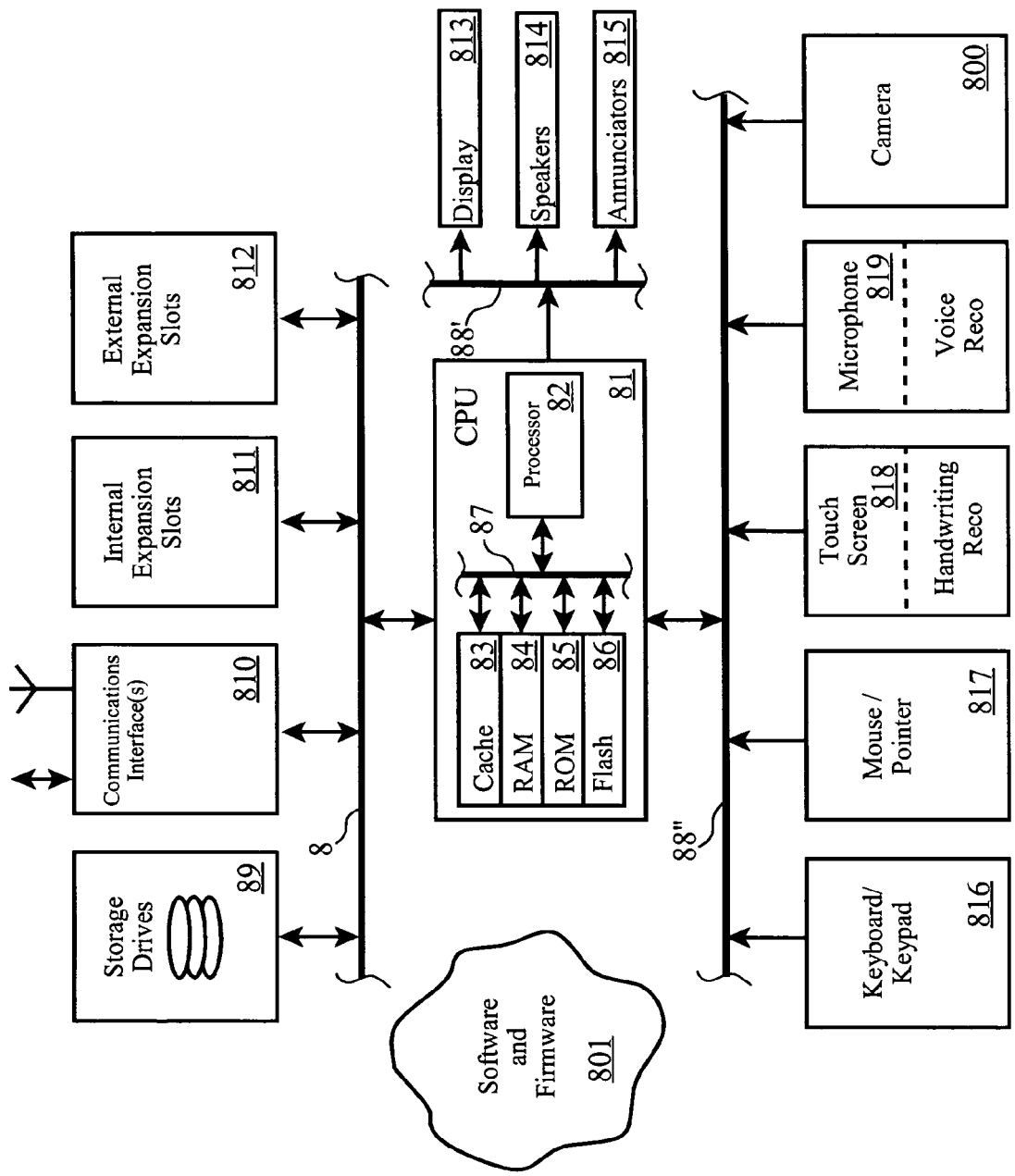
FIG. 8 depicts a generalized computing platform architecture, such as a personal computer, server computer, personal digital assistant, web-enabled wireless telephone, or other processor-based device.

Turning to FIG. 8, a generalized architecture is presented including a central processing unit (81) ("CPU"), which is typically comprised of a microprocessor (82) associated with random access memory ("RAM") (84) and read-only memory ("ROM") (85). Often, the CPU (81) is also provided with cache memory (83) and programmable FlashROM (86). The interface (87) between the microprocessor (82) and the various types of CPU memory is often referred to as a "local bus", but also may be a more generic or industry standard bus.

Many computing platforms are also provided with one or more storage drives (89), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (810), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (811), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (812) allowing the user the ability to easily install and remove hardware expansion devices, such as PCMCIA cards, SmartMedia cards, and various proprietary modules such as removable hard drives, CD drives, and floppy drives.

Often, the storage drives (89), communication interfaces (810), internal expansion slots (811) and external expansion slots (812) are interconnected with the CPU (81) via a standard or industry open bus architecture (88), such as ISA, EISA, or PCI. In many cases, the bus (88) may be of a proprietary design.

A computing platform is usually provided with one or more user input devices, such as a keyboard or a keypad (816), and mouse or pointer device (817), and/or a touch-screen display (818). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (18) is usually provided, often with handwriting recognition capabilities.

Additionally, a microphone (819), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (800), such as a still digital camera or full motion video digital camera.

One or more user output devices, such as a display (813), are also provided with most computing platforms. The display (813) may take many forms, including a Cathode Ray Tube ("CRT"), a Thin Film Transistor ("TFT") array, or a simple set of light emitting diodes ("LED") or liquid crystal display ("LCD") indicators.

One or more speakers (814) and/or annunciators (815) are often associated with computing platforms, too. The speakers (814) may be used to reproduce audio and music, such as the speaker of a wireless telephone or the speakers of a personal computer. Annunciators (815) may take the form of simple beep emitters or buzzers, commonly found on certain devices such as PDAs and PIMs.

These user input and output devices may be directly interconnected (88', 88") to the CPU (81) via a proprietary bus structure and/or interfaces, or they may be interconnected through one or more industry open buses such as ISA, EISA, PCI, etc.

The computing platform is also provided with one or more software and firmware (801) programs to implement the desired functionality of the computing platforms.

Figure 9:
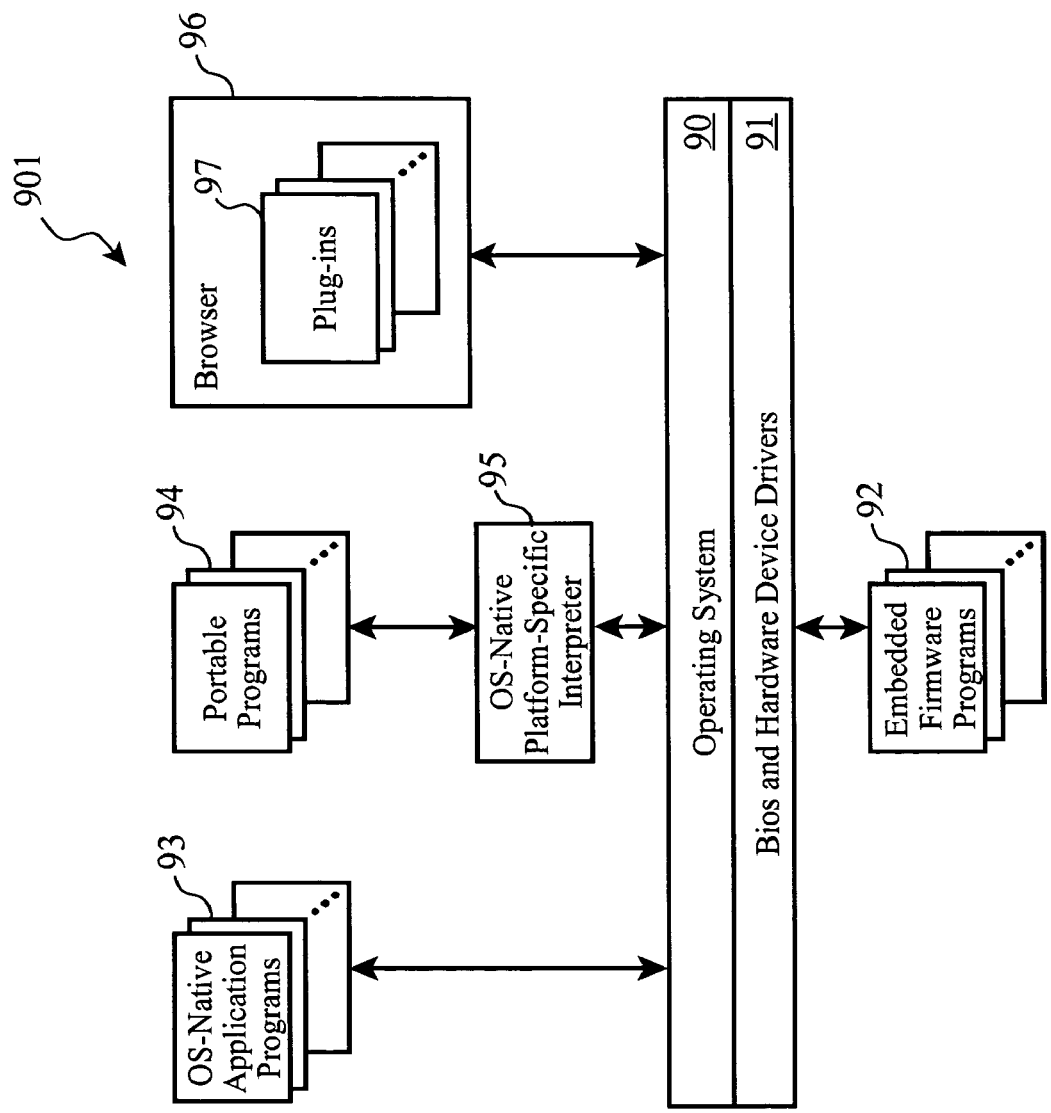
FIG. 9 shows a generalized organization of software and firmware associated with the generalized architecture of FIG. 8.

Turning to now FIG. 9, more detail is given of a generalized organization of software and firmware (801) on this range of computing platforms. One or more operating system ("OS") native application programs (93) may be provided on the computing platform, such as word processors, spreadsheets, contact management utilities, address book, calendar, email client, presentation, financial and bookkeeping programs.

Additionally, one or more "portable" or device-independent programs (94) may be provided, which must be interpreted by an OS-native platform-specific interpreter (95), such as Java™ programs.

Often, computing platforms are also provided with a form of web browser or micro-browser (96), which may also include one or more extensions to the browser such as browser plug-ins (97).

The computing device is often provided with an operating system (90), such as Microsoft Windows™, UNIX, IBM AIX™, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (91) are often provided to allow the operating system (90) and programs to interface to and control the specific hardware functions provided with the computing platform.

Additionally, one or more embedded firmware programs (92) are commonly provided with many computing platforms, which are executed by onboard or "embedded" microprocessors as part of the peripheral device, such as a micro controller or a hard drive, a communication processor, network interface card, or sound or graphics card.

As such, FIGS. 8 and 9 describe in a general sense the various hardware components, software and firmware programs of a wide variety of computing platforms, including but not limited to personal computers, enterprise servers, web servers, PDAs, PIMs, web-enabled telephones, and other appliances such as WebTV™ units. It will be readily recognized by those skilled in the art that the methods and processes of the present invention may be alternatively realized as hardware functions, in part or in whole, without departing from the spirit and scope of the invention.

Intelligence Properties File and Deployment Descriptors

The present invention utilizes "Intelligence Properties Files" model to simplify the installation and configuration process for each component in the final solution design. Using deployment properties files which are based on experience of the user or installer, the need for specialists for each component is reduced or eliminated during installation.

Each time the solution developer specifies or creates a "connection" between two components in the design area, logic of the invention is invoked to determine the needed configuration and option parameters to interface the selected components to each other, as previously disclosed.

This logic provides a "pop-up" dialogue to the solution developer to prompt the user for selections and input based on its properties files. The input information is then used by the logic to configure the two components to interact with each other within the pre-defined constraints and conditions of the logic, thereby relieving a user the necessity of an expert in the configuration and installation for either of the solution components.

When a connection between two or more components is made or defined, the invention automatically recognizes the need for customization information for this type of connection, and prompts the developer to enter the required configuration data necessary to make the connection valid and functional, such as user id and password, data source, network address, encryption options, etc. This information is then saved to configuration files which can later be used during actual installation of the system components into the solution.

Each component of the system solution has its own associated installation and configuration properties file, as well. Each individual properties file enables the semi-automated installation and configuration of prototypes, as well as driving the creation of deployment descriptors for the eventual solution deployment. According to one available embodiment based upon an IBM Websphere Application Server, each deployment descriptor contains configuration data that the run-time environment uses for an application program or system solution component. A deployment descriptor can include information about the following:

(a) the structure and content (enterprise beans or servlets, for example) of the application;
(b) references to internal and external dependencies of the application (e.g. an enterprise bean in an EJB module can require another enterprise bean that is not bundled in the same module);
(c) references to resource factory objects, such as URLs, JDBC DataSources, JavaMail Sessions, JMS Connection Factories, JMS Destinations, and J2C Connection Factories;
(d) security roles that the container uses when implementing the required access control for the application; and
(e) transactional information about how (and whether) the container is to manage transactions for the application.

Typically, deployment descriptors are XML files packaged with the application's files in a Java archive file. For example, a typical Java Version 2 Enterprise Edition ("J2EE") application contains one application-level deployment descriptor file controlling the application as a whole, but may also contain several component-level deployment descriptors, one for each module in the application.

Deployment descriptors often include information on bindings and platform-specific extensions. Binding information maps a logical name of an external dependency or resource to an actual JNDI name. For example, the container uses binding information to locate a remote bean at installation. Platform-specific extensions, such as IBM WAS extensions, are additions to the standard descriptors for J2EE applications, Web applications, and enterprise beans.

Through this function of the present invention, users are allowed to build a blueprint for the solution components with its associated properties files to be used during configuration. According to one aspect of the preferred embodiment, users have options to customize properties file based on their own abilities to configure a product: (a) simple, (b) advanced, or (c) automatic. The simple option permits users to input basic configuration parameters, while the advanced option allows users to highly customize its setup such as enhancing functionality or performance. The automatic option encompasses the most commonly used installation configuration options and parameters.

As such, our new "Intelligence Properties Files" model, simplifies the installation and configuration process by using properties file that allow configuration input based on experience. By using a GUI, a set of predefined "templates" for each component, and implementation intelligence logic, enables speedy assembly of various solution components together into one cohesive solution.

Figure 14:
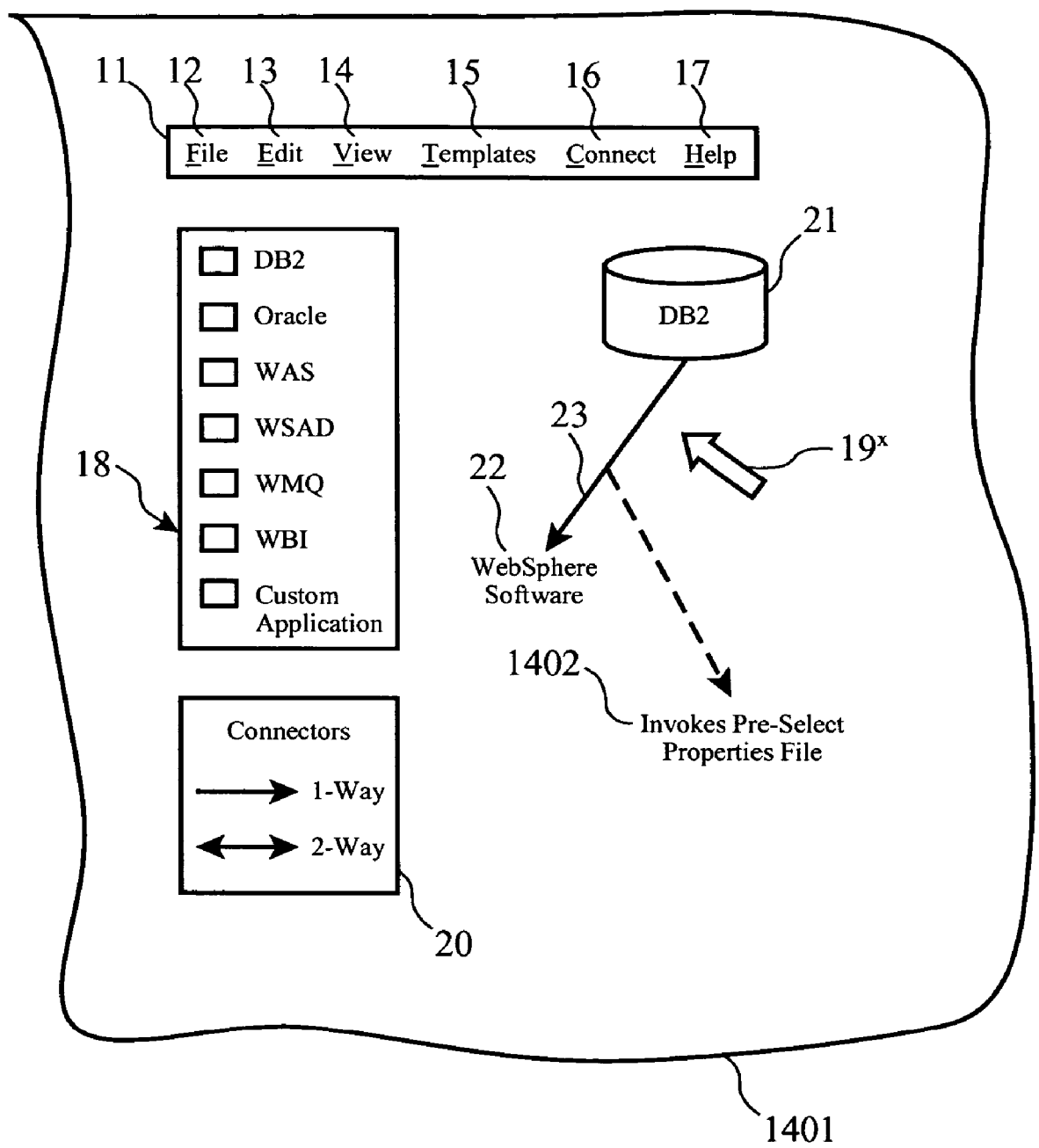
FIG. 14 shows the pre-selected properties file being invoked when relationships between solution components are established.

Turning to FIG. 14, the user interface according to the present invention is illustrated, showing how definitions of interfaces between components are configured or created (1401). When a relationship is established (1402) between two or more components by the user, the intelligence logic of the invention automatically prompts the user for inputs to complete required fields, potentially optional fields, that facilitate the integration process according to pre-defined options and configuration features, as defined by the XML templates. Based on the user's level of configuration complexity selection, the appropriate properties files are pre-loaded into the Solution Wizard Tool.

Simple Configuration Option.

Figure 15:
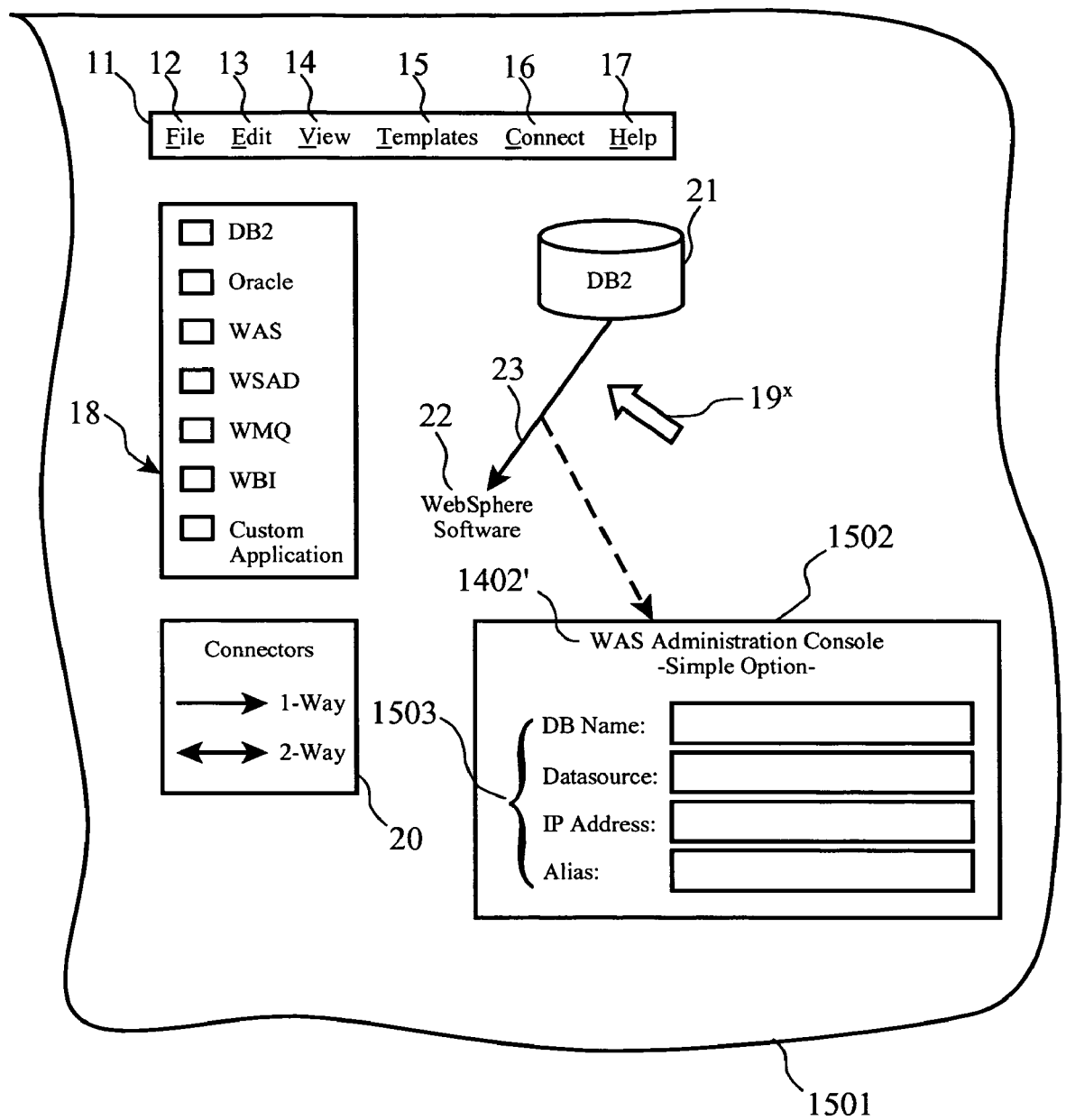
FIG. 15 illustrates pre-selected properties file using the customized simple option.

Continuing with our example and turning to FIG. 15, a user input prompt window (1502) is automatically displayed (1501) by the invention's logic once a connection is completed by the user. In this example, a WAS Administration Console Simple Option (1402') is shown, requesting the user to input fields (1503) to define the interface between the DB2 database instance to the WAS instance, such as the database name, its source, the Internet Protocol ("IP") address, and an alias that denotes the username and password. The simple option encompasses the most commonly required information that users input in order to successfully perform basic configuration.

Advanced Configuration Option.

Figure 16:
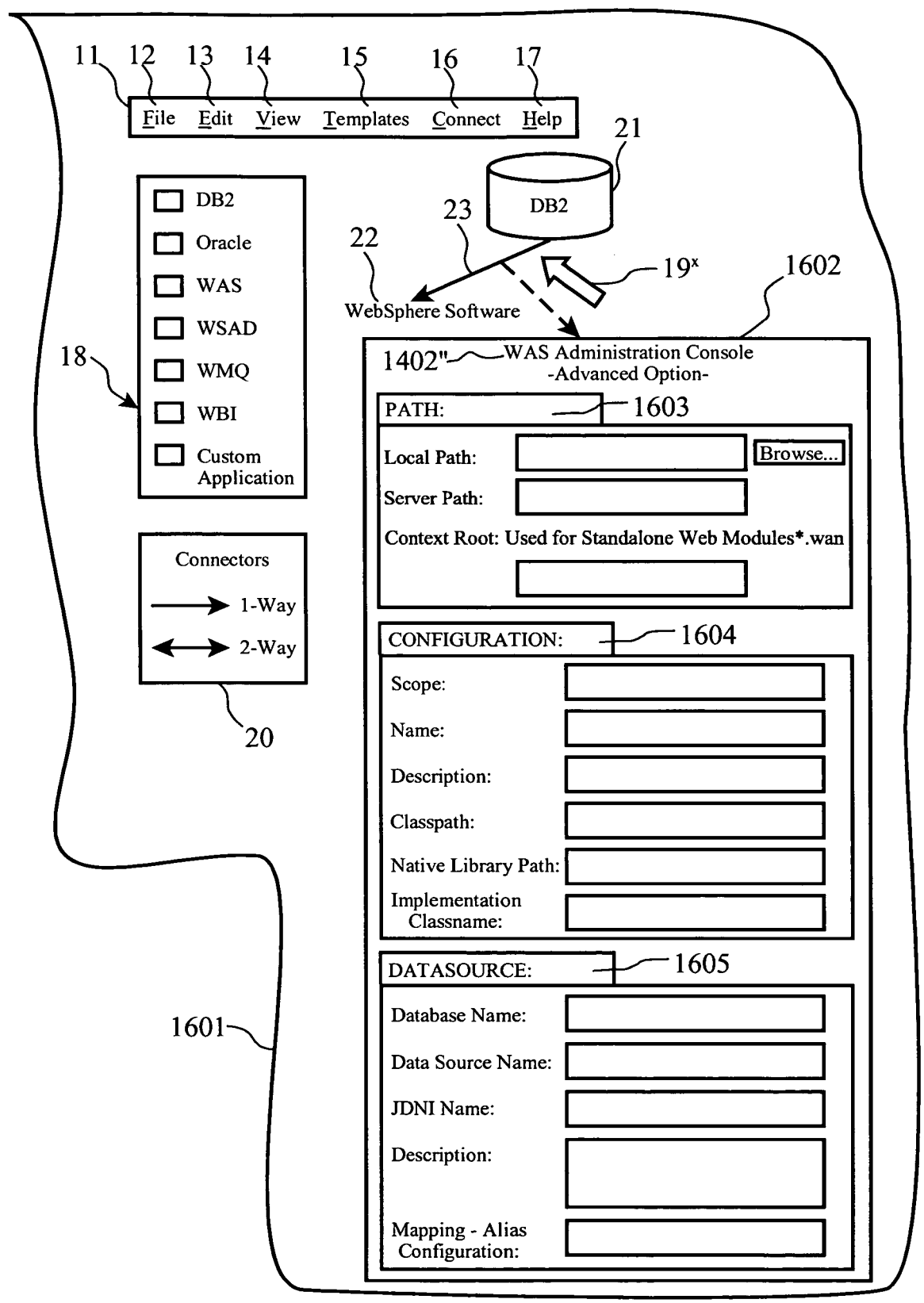
FIG. 16 shows pre-selected properties file using the customized advanced option.

When in-depth installation or configuration is needed, specialized experts are usually required to facilitate the deployment process for each solution component, without the benefit of the present invention. However, by using the present invention, the Intelligence Properties Files enables non-specialists to quickly input desired data into a detailed user prompt window (1601) shown in FIG. 16. In this scenario (1602), the WAS Administration Console Advanced Option (1402") is shown, requesting the user to input fields to define the interface between the WAS to the DB2, preferably using an organized tab display structure. A first tab (1603) in this example allows definition regarding the WAS path, its configuration, and datasource details. The path consists of the actual location of the solution component file such as the file path, server path, and context root.

The configuration tab (1604) allows input from the user of scope, name, description, classpath, native library path, and implementation classname, which is the Java classname of the JDBC driver for the specific implementation.

The datasource section (1605) allows user definition of the database name, datasource name, Java Naming Directory Interface ("JNDI") name, description, and the mapping configuration alias such as username and password. The advanced option consists of particular information users input in order to successfully perform a highly specialized configuration.

Automatic Configuration Option.

Figure 17:
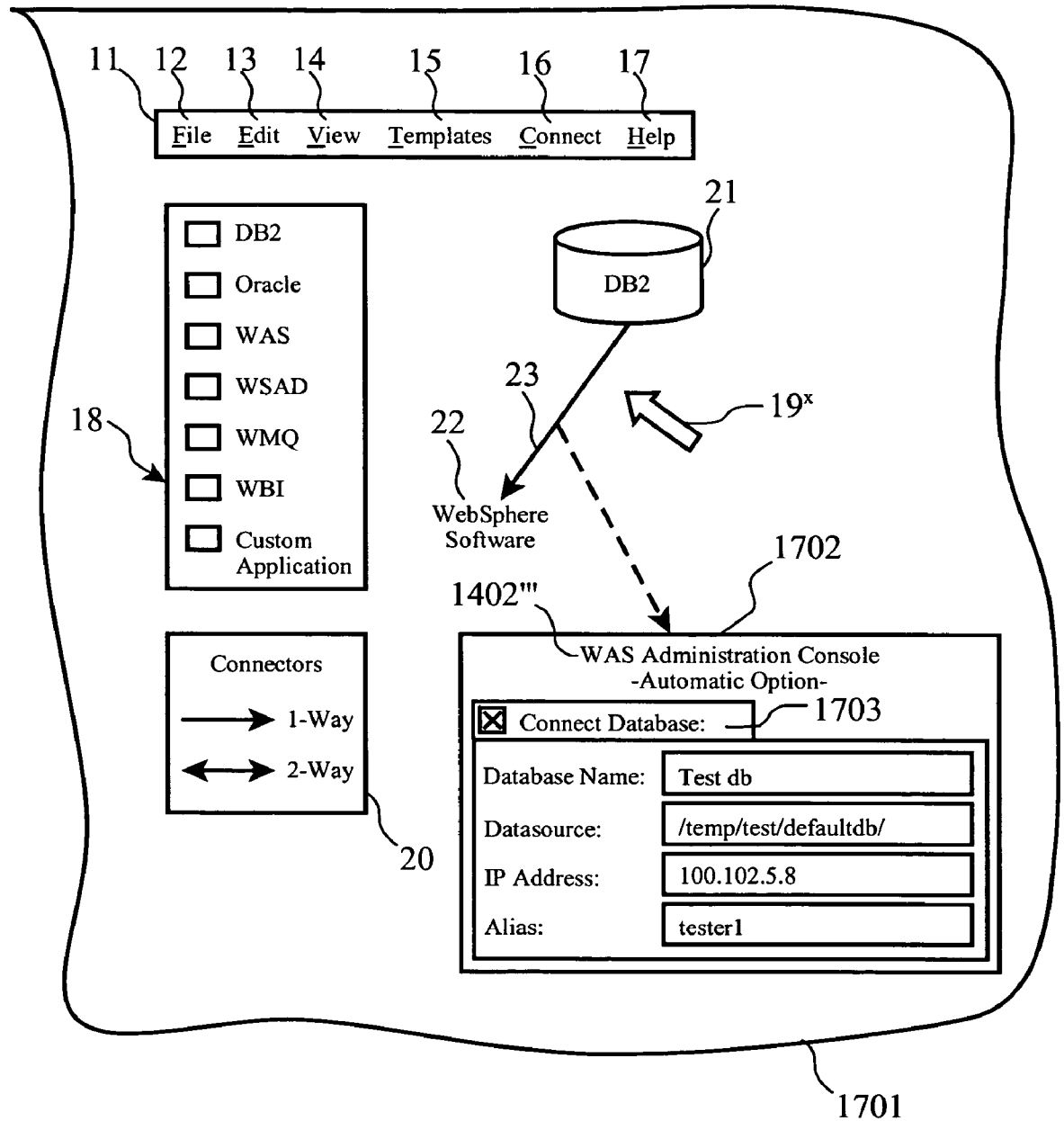
FIG. 17 illustrates pre-selected properties file using customized automatically pre-fills the required parameters for automatic configuration.

On the other hand, because of project constraints such as time, expenses, or resources, users may elect to choose the automatic option to quickly create a proof of concept or blueprint to use during installation and deployment phase. Turning to FIG. 17, the diagram illustrates the automatic properties files option (1701). When the relationship between the DB2 and WAS is established, the automatic option (1702) is invoked. The user prompt window displays the minimal required parameters (1402''') to connect to the desired database (1703) with its default or predefined inputs pre-filled into each criterion: database name, its datasource, the IP address, and an alias. Not only does this enable the user to build solutions quickly using the intelligence properties files, but also eliminates the risk of human errors which can hinder integration.

Configuration Intelligence Logic.

Figure 18:
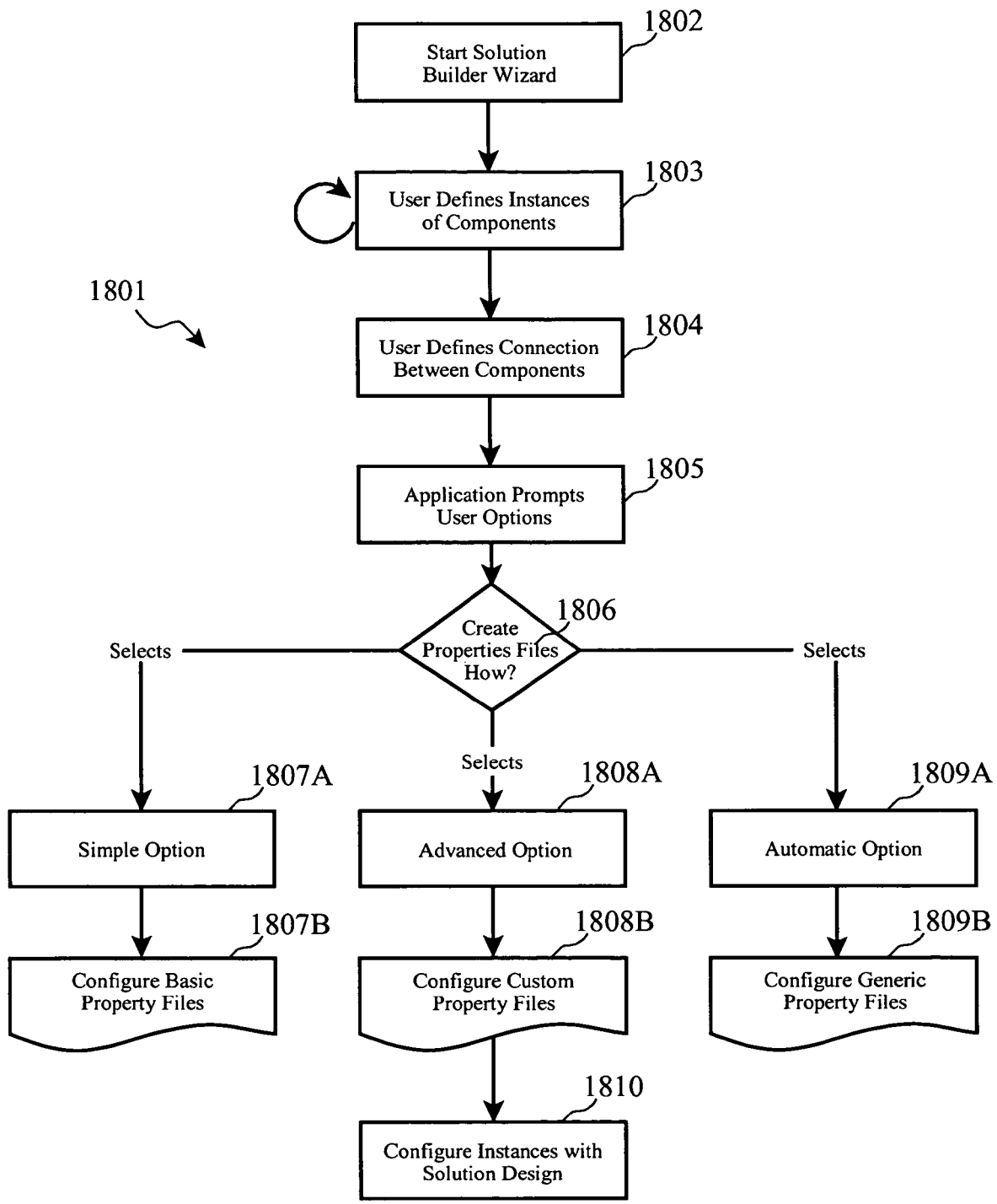
FIG. 18 depicts the logical process to select custom configuration method in relation to intelligence properties files.

Turning now to FIG. 18, the configuration intelligence logical process (1801) of the invention is depicted. The process starts (1802) by user initiation of the Solution Builder Wizard application. The user then defines (1803) instances of system components in the design area, as previously described. When the user defines (1804) a connection between two or more components, the Wizard prompts (1805) the user to make a decision on the level of configuration to be used during prototyping and/or during final deployment: the simple, advanced, or the automatic method.

Based on the user's selection (1806), the user is further prompted for information and input in order to complete the configuration of the properties files. The simple option allows for the customer to input basic configuration parameters (1807A), while the advanced option (1808A) permits users who are highly capable or specialized to enhance functional performances. The automatic option (1809A) takes the most commonly used installation and deploy the solution components using those defaults within an application. Once a selection is made, instances of the related properties files for the chosen alternative created, configured and stored in association with the solution being designed (1807B, 1808B, 1809B). The user is then allowed to continue defining instances of system components (1803), and definition of interfaces and configurations (1801).

Properties Files Advantages.

Using these methods, the Intelligence Properties Files of the invention provide a system solution designer the ability to quickly develop a cohesive solution using a GUI palette to create the necessary components and establish the desired logical relationships between each other. The ease in configuration eliminates the complexity in integration and simplifies the required input information without the user having to sort through tedious amounts of manuals and guidebooks in installation and deployment. This results in massive amount of time, resource, and expense saved using this preferred embodiment. Not only can the proof of concept be swiftly completed, but also the enormous amount of time that can be saved during the actual installation, test, and deployment phase.

Users now have the ability to see actual or close to real simulated environment before actual development occurs. By using the properties files, developers can integrate various solution components using a basic process driven by intelligence logic based on experiences. With this method, level of difficulty or detail in configuration can correspond to an user's aptitude and knowledge without negatively impacting the overall configuration process.

Prototype Simulation and Testing Using Customer Data

Testing a cohesive solution composed of several different types of applications can be very confusing and intricate. In fact, often it requires a massive amount of hardware and software to be pre-installed and integrated before a custom application solution can be tested. For this reason, many new solutions or prototype solutions are often tested in a "live" or "production" environment, which can pose serious problems and risks to the actual business solutions which are being used by actual customers.

By providing a simulated test environment on the prototype solution according to the present invention, much of the complexity and risk in integration can be avoided or even eliminated. Further, customers are allowed to preview how the prototyped solution actually operates under a similar environment, without requiring use or risk to a live or production solution.

Figure 19:
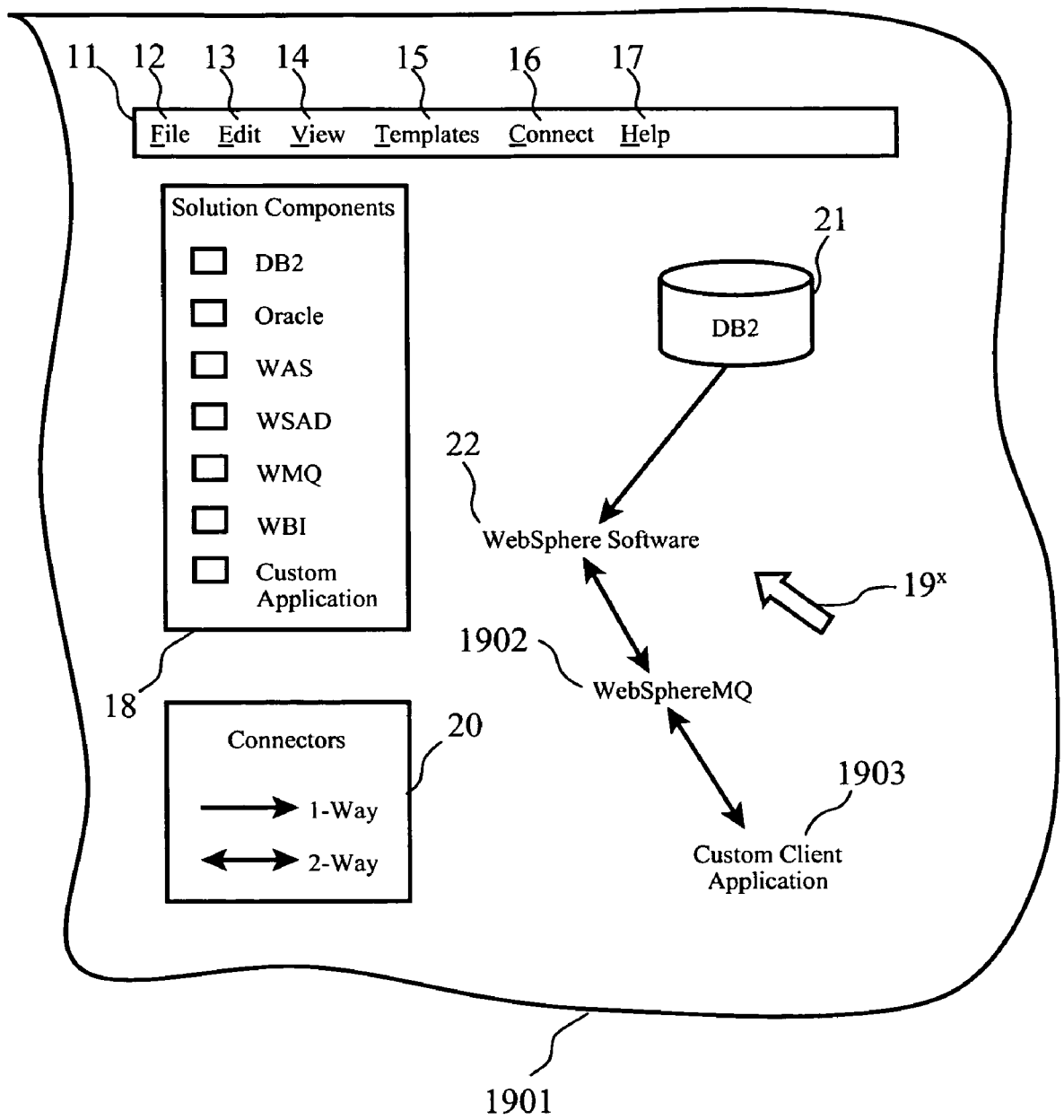
FIG. 19 illustrates selection of solution components for subsequent testing and simulation using actual customer data.

Turning to FIG. 19, the diagram illustrates a portion of GUI (1901) in which a user has selected the required solution components and established its respective relationships. The user has decided in this example to add an instance of the IBM WebSphereMQ product (1902) connected to a custom client application (1903) to the existing WAS (22) and a database (21) instances in the design area of the Solution Builder Wizard GUI.

By way of background and for greater understandability to the reader, we now diverge temporarily to provide more details on the well-known IBM WebSphere MQ messaging capabilities and mechanisms which is utilized in one available embodiment of the present invention. WebSphere MQ™ messaging products enable application integration by allowing business applications to exchange information between each other within the same computing platform, as well as across different platforms, by sending and receiving data as messages according to a published format by IBM. This messaging system is available for many platforms and operating systems, including Linux for Intel™-based platforms as well as IBM zSeries, iSeries and Microsoft Windows XP based platforms. MQ messaging allows programmers to focus on functionality of their system component, leaving details of interoperability and intercommunication to be handled by MQ. MQ utilizes Secure Sockets Layer ("SSL") network-based communications protocols, and supports Java™ Message Server ("JMS") for compatibility with many existing solution products. It will be recognized that use of other messaging services in place of IBM's MQ service is within the scope of the present invention, and that use of the MQ product as described herein represents just one of several embodiment options of the invention.

Figure 20:
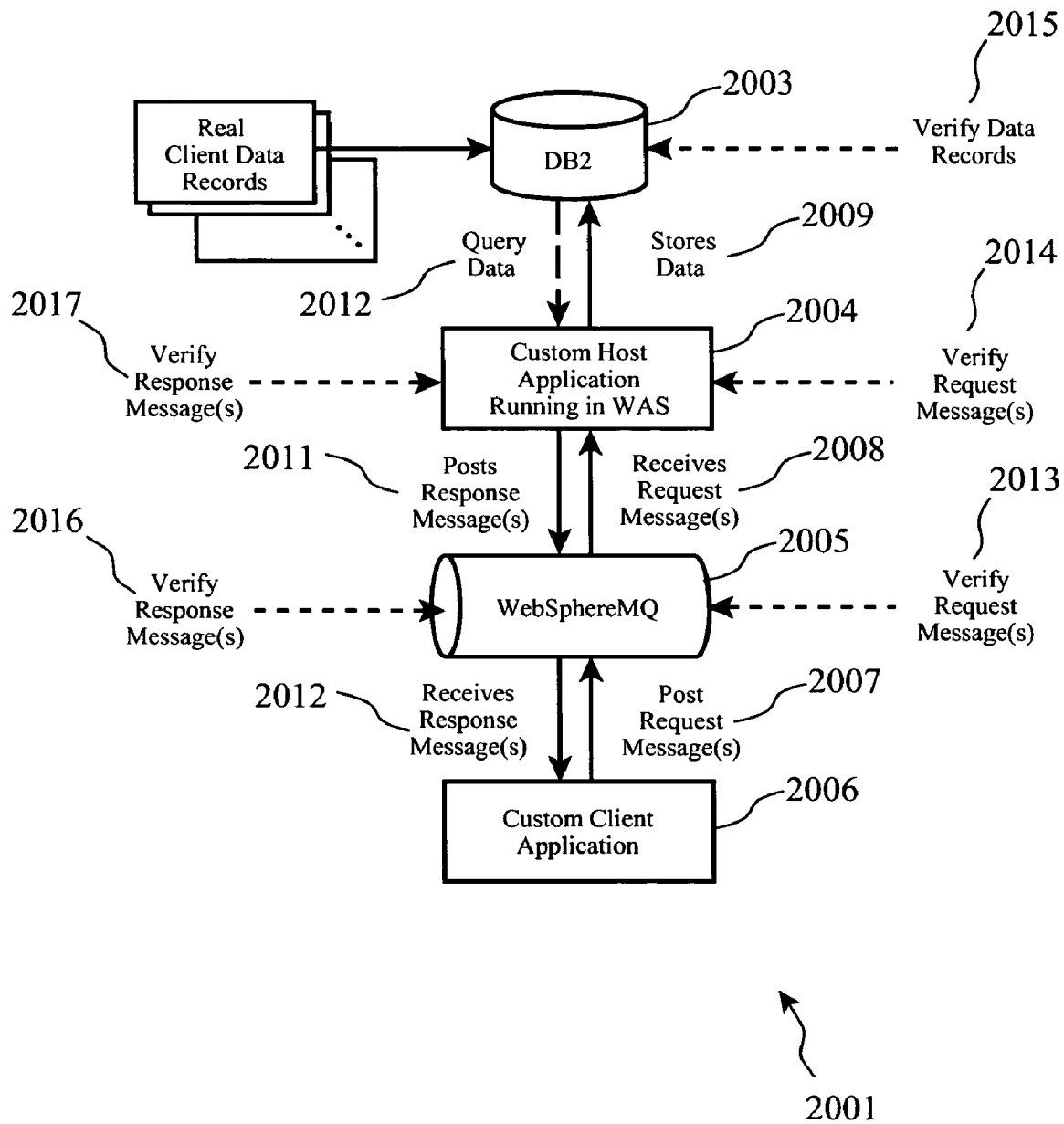
FIG. 20 depicts logical process according to the present invention of an automated real time testing of a prototyped solution in a Solution Builder Wizard environment using actual customer data.

A logical process and system diagram (2001) according to the present invention is shown in FIG. 20. Once the user has used the Solution Builder Wizard to design the prototyped solution (or portion of a solution), a subset of a real customer data (2002) is uploaded into the database (2003). Within the simulated test environment of the Solution Builder Wizard, various types of test scripts are initiated to perform and validate each test case. According to one aspect of the present invention, the behavioral models which are configured for each instance of each component in the system under design communicate with each other using a message-based scheme, such as the aforementioned WebSphere MQ messaging system or an equivalent.

During simulation and/or testing, the custom client application (2006) first posts a request message (2007) to the WebSphereMQ (2005). A test validation can verify at this stage whether or not request message was received (2013). The WebSphereMQ service passes that message to the custom host application that is running in WAS (2004), which receives the request message (2008). The user can optionally confirm that the request message is received (2014), as previously described in conjunction with the console.

The host application (2004) processes the request(s), and stores the data (2009) into the database (2003), for example. Verification can be performed on the database to ensure new data records are added or existing records have been modified or updated (2015).

In one alternative to the prototyped solution, the custom host application may not necessarily require any data from the database. However, if records are needed, then the database sends the query data (2010) back to the custom host application for processing. Again, a listener may be used to validate that the response message is processed (2017).

Once completed, then a response message is posted back (2011) to the WebSphereMQ. A subsequent check can confirm that the response message is received (2016) by the solution component. The WebSphereMQ listens for any messages then pass it back to the custom client application where it receives the response message (2012). In this example, it shows that the user can utilize five checkpoints to verify proper messages are being passed between solution components and whether or not its results are successful. Any errors within these five checkpoints alerts its tester that the prototyped solution is experiencing integration problems.

It will be appreciated by those skilled in the art, however, that many testing alternatives or methods may be used depending on an user's initial setup within the GUI palette and the invention is not limited to these specific embodiments. All solution components can communicate via messaging with one another, therefore, the simulated test environment can check to ensure that one object will respond correctly with another object. In addition, testing data and parameters may be defined to meet customer expectations and real customer data can be used to provide a close to exact look on how the proposed prototyped solution will actually work. This allows the customer the ability to review a proof of concept from a comprehensive perspective—not only from development view point, but also the final end product itself with real applicable data records.

Problem Determination Process

Once simulation is completed, the challenging task of problem determination in prototyped solution arises, also known as "debugging" the system solution. Very rarely do initial designs of complex systems operate completely as specified and expected, and almost always, some anomalies in operation or function are observed. Determining the source of the problem(s) is first required, followed by developing potential "fixes" or "solutions" to the problems, which is then followed by re-testing or verification testing and simulation.

Using the present invention, the user or system designer has the ability to debug a system solution based on its data flows during the simulation process. As the simulations are carried out using a message-based infrastructure interconnecting the many system components which are represented using behavioral models, debugging of the system level design is enabled by the invention's ability to probe, tap, or trace communications between components throughout simulation, to capture the exchanged messages, and to add tracking information to aid in problem determination.

Figure 21:
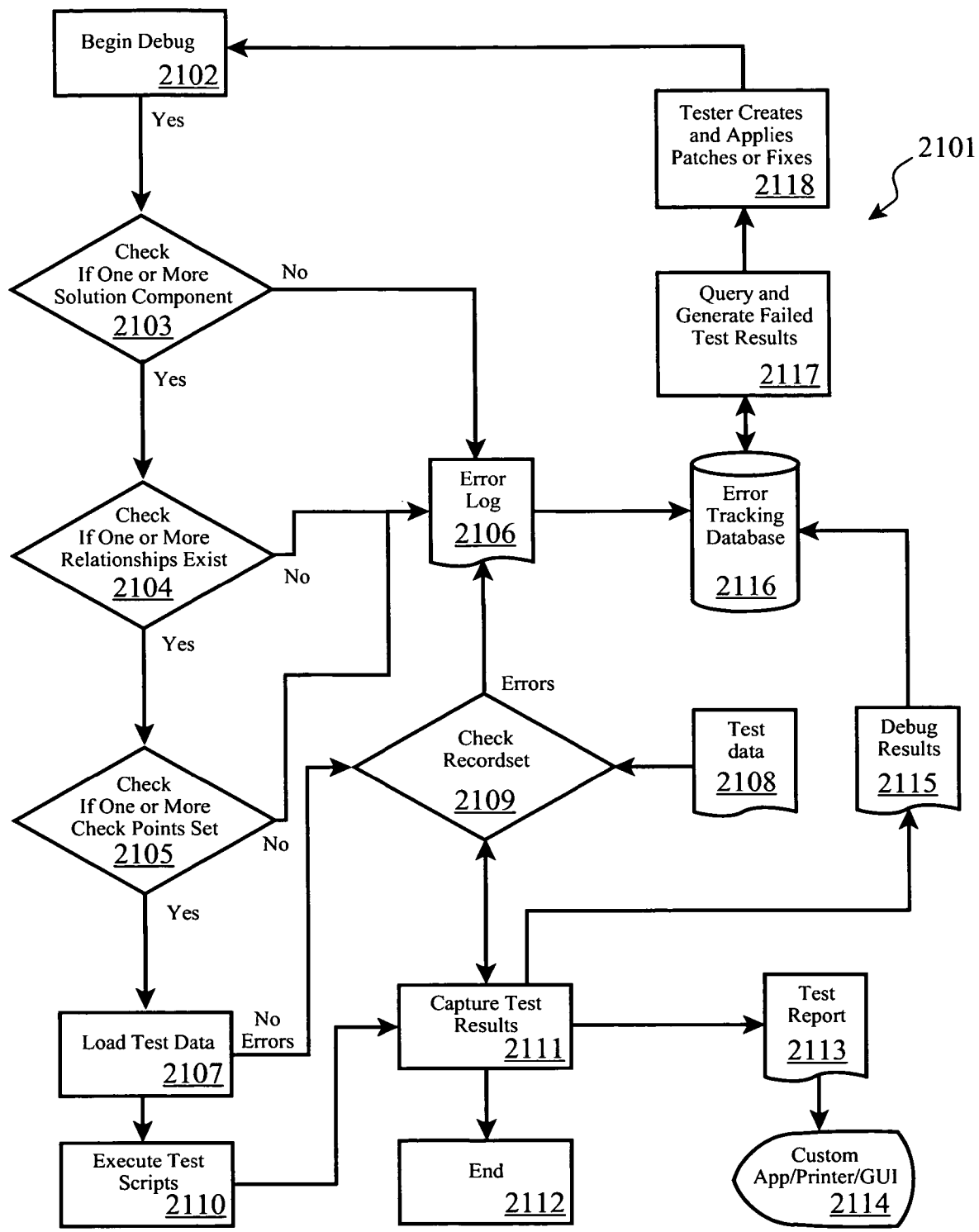
FIG. 21 sets forth a logical process for debugging a prototyped solution as performed by the present invention.

Turning to FIG. 21, the diagram shows the logical debugging procedure (2101). The user initiates the process (2102) and then it checks (2103) to see whether or not at least one or more solution component exists in the design area of the GUI. If not, then an error log entry is created (2106), otherwise it checks to ensure at least one or more relationships between solution components are established (2104) in the prototyped system design. This is to verify that integration between solution components has been defined in the prototyped solution, which allows appropriate data flow to occur. If no relationships exist, then a record is made to the error log (2106).

Afterwards, the system verifies that one or more testing check points are defined and set (2105). These are points in the system design where the designer wishes to capture or trace communications between components, such as the verification points (2017, 2014, 2016, etc.) shown in FIG. 20. As the infrastructure of the Solution Builder Wizard is message based (e.g. the components interface to each other using messaging protocols), these taps or probes into the communications are realized by capturing time-stamped copies of messages between components.

When all three validations are completed, the system loads the test data (2107), which can consist of a subset of real customer information, simulation data, manually created recordsets, or even randomly generated system data, as previously described. Before test data is loaded into the debug process, it first is preferably checked (2109) to ensure its own data integrity. If a problem with the test data is found, then a record is logged into the error log before data can be loaded for further testing and debugging. All error logs are then stored in the overall error tracking database (2116).

Once the test data is validated, test scripts or test cases are executed (2110) through the process of simulation, as previously discussed. When simulation is completed, the system captures test results (2111) in the form of captured time-stamped messages between components, and other tracking information (e.g. originator, destination, session ID, addresses, routing information, etc.).

The user is then allowed three options: (a) to end the debug process (2112), (b) to create a test report (2113) that can be displayed through a custom application, GUI, or be sent to a printer (2114), or (c) to create a debug error log (2115) that feeds into the error tracking database (2116).

Once simulation is completed, the user has the ability to query and generate failed test results (2117) from the error tracking database. This provides a list on the overall errors that have occurred during one test run where proper data flow did not occur, and provides copies of the messages which were captured during the simulation. The designer can create and apply patches or fixes (2118) that resolve these issues, followed by repeating the simulation and message capture process.

It should be noted that using the present invention, the debug process differs from traditional debugging procedure because it does not occur solely in development nor production environment. The user is not just troubleshooting one module and previewing written codes line by line, but rather resolving the whole prototyped solution which is composed of one or more solution components with its relationships and associated properties files.

Furthermore, the user is not restricted to create a staging environment which normally requires enormous amount of human and IT resources to test before sending into production environment. In fact, the prototyped solution can be tested and debugged quickly without impacting current real, "live" transactions and processes running in production.

Performance Tuning

During simulation, or following simulation, the user is able to verify performance of the system under design, such as response times, accuracy, characteristics under load, etc. The designer may then adjust configuration parameters of each component of the system under design in the manners previously described in order to improve or change one or more performance characteristics. Subsequent or continued simulation can be performed, as already described, to verify the performance with the changes, and to determine if the change are to be implemented in the final solution. This enables the designer to optimize the performance of the new solution in an off-line mode, which is traditionally only possible when "live" or running on-line, thereby allowing the user to experiment with changes which would be too risky, too difficult, too expensive or too time consuming to do in a live environment.

As an additional benefit of the present invention, the user may test alternate components and their affect on overall system performance using the same methodology. For example, the user may first create a system solution using a first database component from a first provider, followed by simulation and performance determination. Then, the user may easily change (e.g. delete and replace) the first database component with a second database component from another provider, re-run the simulation, and compare the performance with the second database to the performance with the first database. This enables the user to easily compare component options without the need for risky, expensive, and time consuming testing in a live environment.

Deployment Descriptor Generation

Once performance tuning has been completed, the prototype solution becomes a smaller, but fully-functional version of the desired solution. In order to utilize the time and effort spent on the prototyped solution, it is ideal to reuse some if not all of the items completed when migrating to a larger scale of the system. The packaging, delivery, and installation and configuration of the solution of any size is often complex and difficult.

Typically, components are packaged separately, and later installed together and integrated under the new "production" computing environment. Because initial designs of complex systems rarely operate seamlessly as specified and expected, some anomalies in operation or function are often observed.

Therefore, determining the source of the problem(s) is required, and consultants often repeat the same testing processes during the installation and configuration phase again.

Using the present invention, the user or system designer has the ability to utilize existing configuration information based on the prototyped solution. By using the Solution Builder Wizard application, the configuration information can be collected, exported, and used to set up the real customer environment.

The present invention enables user the ability to automatically generate "deployment code" or "deployment descriptors" that can be used at the customer site for installation. In addition, by using a well-tested and functional prototyped solution, the system designer can reproduce exact deployment environment without spending excessive time and energy to reproduce a replica from scratch.

Figure 23:
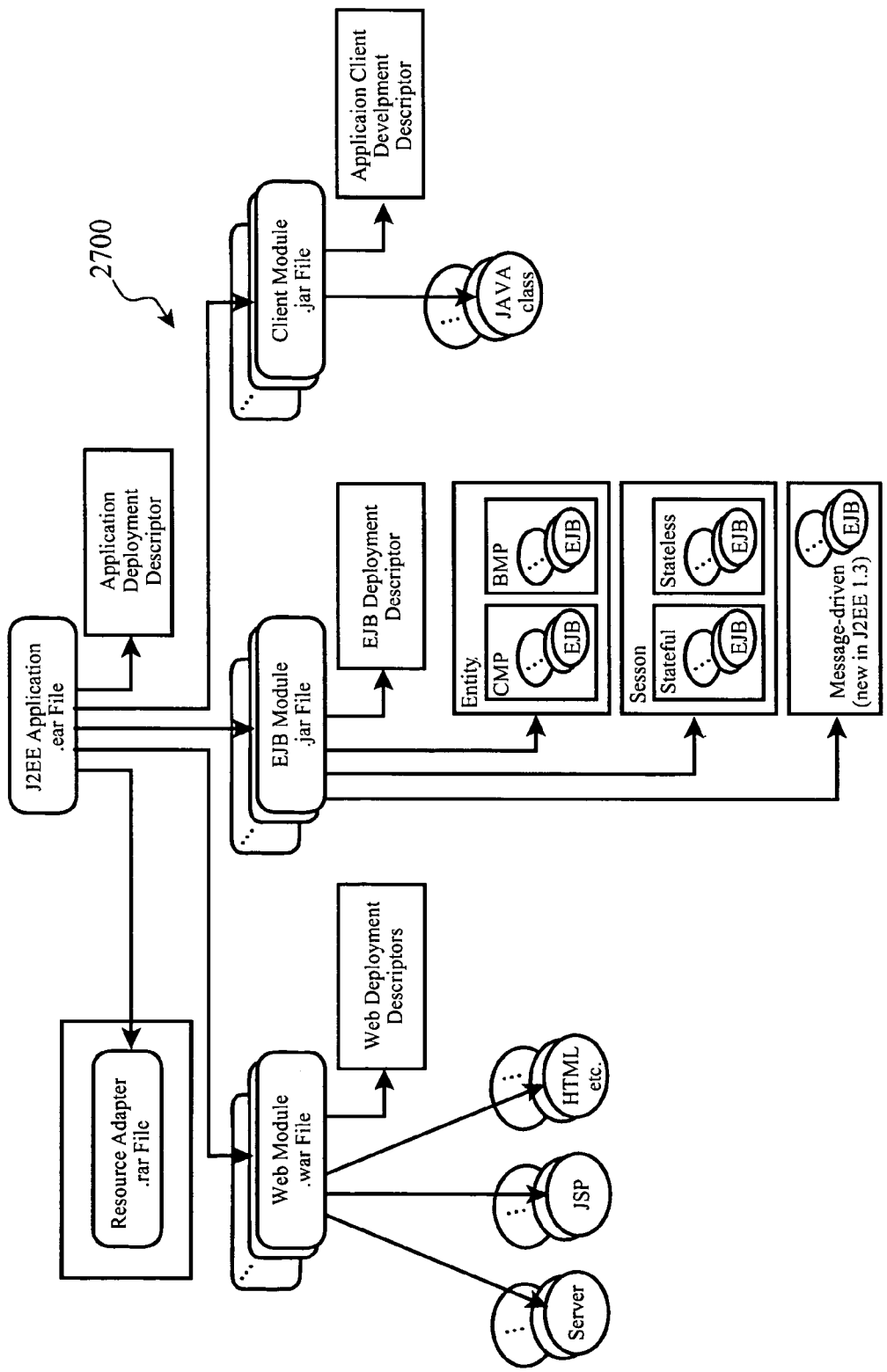
FIG. 23 shows a typical organization of application components and deployment descriptors when packaged for deployment.

Deployment descriptors are files used by computing environments such as Java Version 2 Enterprise Edition ("J2EE") for assisting or automating the installation and integration of modules, beans, and applications. Publications such as "IBM WebSphere V5.0 for Linux, Implementation and Deployment Guide WebSphere Handbook Series" by Mark Endrei, et al., which is hereby incorporated by reference, provide details on using deployment descriptors, these descriptors are usually created manually. For example, in a J2EE environment, an "application" can consist of multiple modules, such as a "EAR" file packaging a one or more application files in a "JAR" file, one or more Enterprise Java Beans ("EJBs") in a JAR file, and one or more web components, also in a JAR file. Each of these JAR files or components may also have a Deployment Descriptor file ("DD"), written in declarative language such as XML in the case of J2EE, as illustrated (2700) in FIG. 23. Deployment desciptor files themselves are well known in the industry, such as the explanations and definitions provided by Sun Microsystems in their "J2EE™ Developer's Guide—Overview—J2EE Applications", which is also incorporated by reference into the present disclosure.

Figure 22:
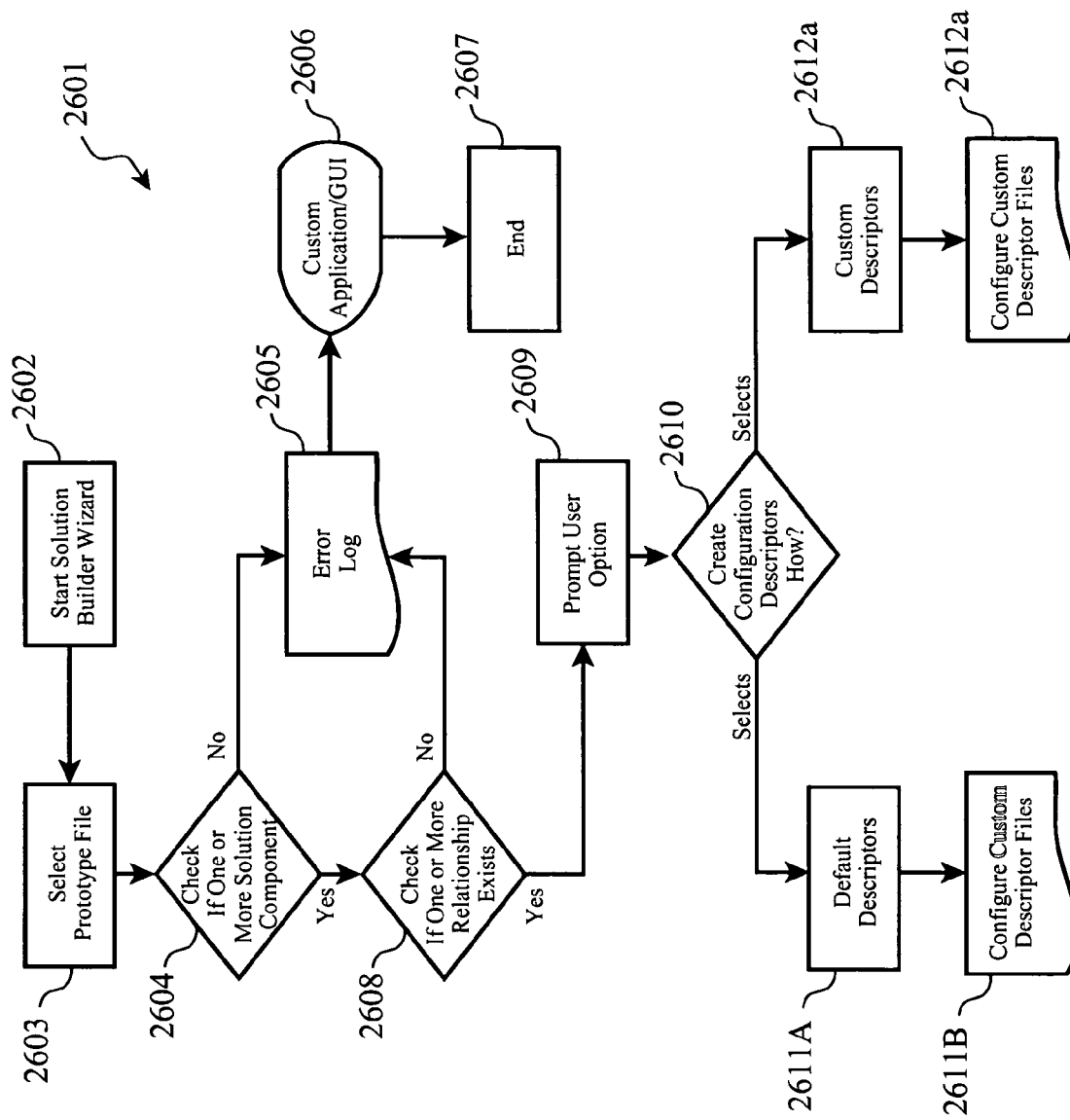
FIG. 22 illustrates the deployment descriptor process performed by the present invention.

Turning to FIG. 22, the diagram illustrates the deployment descriptor generation process (2601) according to the invention: When a prototype solution has been tested and debugged following the set procedures, an user can have the option to generate its related descriptor files to be used for installation and deployment. First, the user initiates the Solution Builder Wizard GUI application (2602) and chooses the desired prototype solution file document (2603).

Then, the system checks to ensure that there are one or more solution components (2604) that make-up the prototype solution file. If not, then an error record is written to the error log (2605) and an error message is displayed via a custom application to the user's GUI (2606).

If the verification passes, then the system checks to see if there are one or more relationships that exist between component(s) (2608). If not, which may be an indication of an incomplete system solution design, the invention follows the same error log process (2605, 2606, 2607).

Otherwise, the system prompts the user for any options regarding the type of configuration files needed for deployment of the solution into a production environment (2609). The user has the options to generate a default descriptor files (2611A) which are predefined and set by the system, or to generate one or more custom descriptor files (2612A).

The method of generating "default" deployment descriptor files consists of creating all the related configuration, installation, and code files pertaining to the specified prototype solution (2611B) based upon the interfaces and component options already known by the system and collected during system solution design. The custom choice option enables the user to choose specifically what is actually needed from a selection of available files related to the prototyped solution (2612B).

Once the deployment files are generated, the users have a wide variety of options to transmit the information. It can be electronically mailed between interested parties, checked into a version control system such as IBM's Configuration Management Version Control ("CMVC")™, to provide users the capability to reproduce solutions in a timely fashion with the knowledge that it is also fully functioning and well-tested.

It should be noted that using the present invention, the deployment descriptor process differs from traditional packaging and installation procedure because it does not require information from various sources. Rather, all the configuration information is solicited from the Solution Builder Wizard along with its component relationships, tested data, and development codes.

As such, use of the invention allows creation of an installable package for industry solutions while reducing room for errors which may adversely impact project schedule.

CONCLUSION

Certain embodiments and design choices have been described and illustrated in the foregoing paragraphs in order to disclose the invention and its preferred embodiment. It will be appreciated by those skilled in the art, however, that the scope of the invention is not limited to these specific embodiments, and that many variations and choices regarding, but not limited to, operating system, programming language, programming methodology, and platform, can be made without departing from the spirit and scope of the present invention. Therefore, the scope of the present invention is defined by the following claims.

What is claimed is:

1. A method of generating deployment descriptor files for automation of installation and integration of computing system solution components, the method comprising:
   associating a plurality of configurable behavioral models with a system solution design, each of said models being associated with a class or type of system solution component;
   configuring a plurality of instantiations of said behavioral models to contain one or more behavioral parameters according to a set of user inputs;
   responsive to a user attempting to define an connection between two of said behavioral model instances:
      invoking a sub-template generator displaying an intelligence form on a Graphical User Interface to said user, said intelligence form being selected according to an expertise level of said user from a group comprising a simple configuration input form, an advanced configuration input form, and an automatic configuration input form;
      receiving one or more inputs from said user via said Graphical User Interface establishing configuration and option parameters for one or both of said connected behavioral models;
      saving said configuration parameters and option parameters in a sub-template wherein said sub-template defines an interface between two instances in said system solution design; and
      associating said sub-template with said defined connection;
   generating one or more deployment descriptors by extracting said behavioral parameters, said configuration parameters, and said option parameters from each configured behavioral model instance and from each sub-template;
   producing a deployment descriptor file in a computer storage memory for each of said connected instances compatible with a targeted computer according to said extracted parameters;
   packaging said configured behavioral model instances and said deployment descriptor files into an application package; and
   automatically deploying one or more of said configured behavioral model instances onto said computer according to said deployment descriptors in said application package.

2. The method as set forth in claim 1 wherein said producing a deployment descriptor file comprises producing an extensible markup language deployment descriptor file.

3. The method as set forth in claim 1 wherein said targeted computer comprises an enterprise server computer.

4. The method as set forth in claim 1 further comprising checking said application package into a version control system.

5. A computer storage memory comprising:
   one or more computer storage memories suitable for encoding computer programs; and
   one or more computer programs encoded by said computer storage memory, when executed:
      associating a plurality of configurable behavioral models with a system solution design, each of said models being associated with a class or type of system solution component;
      configuring a plurality of instantiations of said behavioral models to contain one or more behavioral parameters according to a set of user inputs;
      responsive to a user attempting to define an connection between two of said behavioral model instances:
         invoking a sub-template generator displaying an intelligence form on a Graphical User Interface to said user, said intelligence form being selected according to an expertise level of said user from a group comprising a simple configuration input form, an advanced configuration input form, and an automatic configuration input form;

receiving one or more inputs from said user via said Graphical User Interface establishing configuration and option parameters for one or both of said connected behavioral models;

saving said configuration parameters and option parameters in a sub-template wherein said sub-template defines an interface between two instances in said system solution design; and associating said sub-template with said defined connection;

generating one or more deployment descriptors by extracting said behavioral parameters, said configuration parameters, and said option parameters from each configured behavioral model instance and from each sub-template;

producing in a computer storage memory a deployment descriptor file for each of said connected instances compatible with a targeted computer according to said extracted parameters;

packaging said configured behavioral model instances and said deployment descriptor files into an application package; and automatically deploying one or more of said configured behavioral model instances onto said computer according to said deployment descriptors in said application package.

6. The computer storage memory as set forth in claim 5 wherein said producing a deployment descriptor file comprises producing an extensible markup language deployment descriptor file.

7. The computer storage memory as set forth in claim 5 wherein said targeted computer comprises an enterprise server computer.

8. The computer storage memory as set forth in claim 5 further comprising computer programs encoded by said computer storage memory, when executed, checking said application package into a version control system.

9. A system comprising:

a computer readable memory storing a plurality of configurable behavioral models associated with a system solution design, each of said models being associated with a class or type of system solution component;

a plurality of instantiations of said behavioral models in a computer readable memory configured to contain one or more behavioral parameters according to a set of user inputs;

a sub-template generator portion of a development workstation computer, responsive to a user attempting to define an connection between two of said behavioral model instances:

displaying an intelligence form on a Graphical User Interface to said user, said intelligence form being selected according to an expertise level of said user from a group comprising a simple configuration input form, an advanced configuration input form, and an automatic configuration input form;

receiving one or more inputs from said user via said Graphical User Interface establishing configuration and option parameters for one or both of said connected behavioral models;

saving said configuration parameters and option parameters in a sub-template wherein said sub-template defines an interface between two instances in said system solution design; and associating said sub-template with said defined connection;

a deployment descriptor generator portion of a development workstation computer generating one or more deployment descriptors by extracting said behavioral parameters, said configuration parameters, and said option parameters from each configured behavioral model instance and from each sub-template, and producing in a computer storage memory a deployment descriptor file for each of said connected instances compatible with a targeted computer according to said extracted parameters, a packager portion of a development workstation computer packaging said configured behavioral model instances and said deployment descriptor files into an application package; and an automatic deployer portion of a development workstation computer automatically deploying one or more of said configured behavioral model instances onto said computer according to said deployment descriptors in said application package.

10. The system of claim 9 wherein said producing a deployment descriptor file comprises producing an extensible markup language deployment descriptor file.

11. The system of claim 9 wherein said targeted computer comprises an enterprise server computer.

12. The system of claim 9 further comprising computer programs encoded by said computer storage memory, when executed, checking said application package into a version control system.

* * * * *